US010115411B1

(12) United States Patent
Chu et al.

(10) Patent No.: US 10,115,411 B1
(45) Date of Patent: Oct. 30, 2018

(54) METHODS FOR SUPPRESSING RESIDUAL ECHO

(71) Applicant: Amazon Technologies, Inc., Seattle, WA (US)

(72) Inventors: Wai Chung Chu, San Jose, CA (US); Carlo Murgia, Santa Clara, CA (US); Hyeong Cheol Kim, Irvine, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/823,050

(22) Filed: Nov. 27, 2017

(51) Int. Cl.

| | |
|---|---|
| ***H04B 1/38*** | (2015.01) |
| ***G10L 21/0224*** | (2013.01) |
| ***G10L 21/0232*** | (2013.01) |
| ***G10L 21/02*** | (2013.01) |
| *G10L 21/0208* | (2013.01) |
| *G10L 21/0216* | (2013.01) |

(52) U.S. Cl.
CPC ...... *G10L 21/0224* (2013.01); *G10L 21/0205* (2013.01); *G10L 21/0232* (2013.01); *G10L 2021/02082* (2013.01); *G10L 2021/02166* (2013.01)

(58) Field of Classification Search
CPC ....... G10L 2021/02082; G10L 21/0208; G10L 2021/02166; G10L 21/02; G10L 19/24; G10L 19/22; G10L 2021/02165; G10L 21/0216; G10L 19/005; G10L 19/008; G10L 19/012; G10L 19/02; G10L 19/0208; G10L 19/032; G10L 19/26; G10L 25/78
USPC .......................................................... 455/570
See application file for complete search history.

(56) References Cited

U.S. PATENT DOCUMENTS 9,313,598 B2 * 4/2016 Ramteke .................. H04S 3/02
2013/0226598 A1 * 8/2013 Laaksonen .......... G10L 19/0208 704/500
2014/0335917 A1 * 11/2014 Tetelbaum ............ H04M 9/082 455/570

* cited by examiner

*Primary Examiner* — Ajibola Akinyemi
(74) *Attorney, Agent, or Firm* — Pierce Atwood LLP

(57) ABSTRACT

A system configured to improve speech quality by performing residual echo suppression (RES). The system may detect when double-talk conditions are present in individual frequency bands during a voice conversation and may determine gain values for the individual frequency bands. The system may determine whether double-talk conditions are present based on a normalized cross power spectral density function in a frequency domain. If double-talk conditions are present in a frequency band or far end energy is low, the system may determine a gain value that passes audio data in the frequency band, whereas if double-talk conditions are not present, the system may determine a gain value that attenuates audio data in the frequency band. The system may determine binary gain values using a decision threshold value or continuous gain values using a mapping function. The system may control an amount of suppression by selecting different mapping functions and/or parameters.

20 Claims, 12 Drawing Sheets

P42649-US

METHODS FOR SUPPRESSING RESIDUAL ECHO

BACKGROUND

With the advancement of technology, the use and popularity of electronic devices has increased considerably. Electronic devices are commonly used to capture and process audio data.

BRIEF DESCRIPTION OF DRAWINGS

For a more complete understanding of the present disclosure, reference is now made to the following description taken in conjunction with the accompanying drawings.

DETAILED DESCRIPTION

Figure 1:
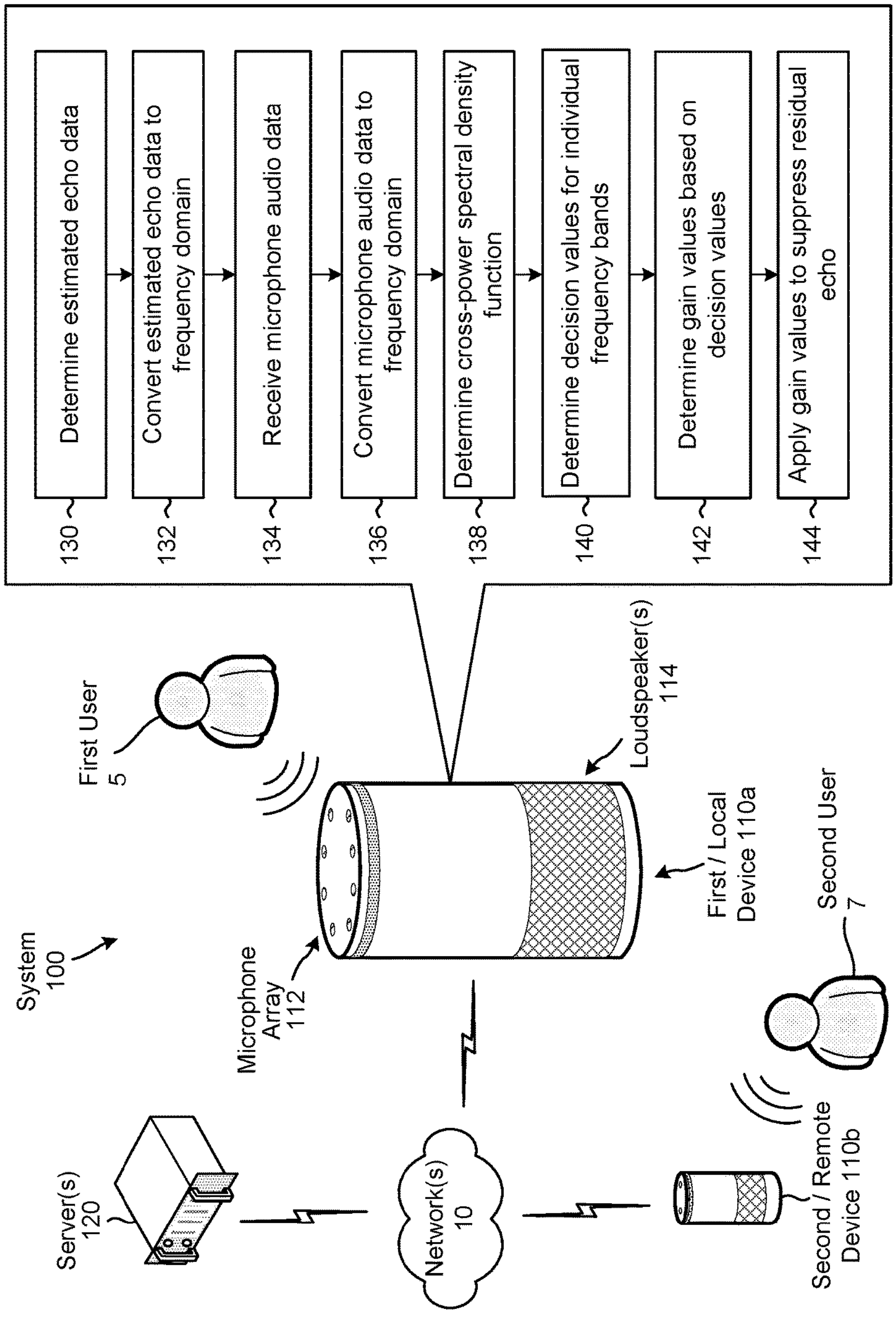
FIG. 1 illustrates a system according to embodiments of the present disclosure.

Electronic devices may be used to capture audio and process audio data. The audio data may be used for voice commands and/or may be output by loudspeakers as part of a communication session. During a communication session, loudspeakers may generate audio for output using remote audio data received from a remote device while a microphone captures local audio and generates local audio data for input processing. One problem that may be encountered by such systems is that a microphone may be capturing audio that includes some sound that is being output by an output loudspeaker (such as audio from one party to a communication session being played on a stereo loudspeaker in the same location that a user is trying to speak into a microphone for the communication session). An electronic device may perform acoustic echo cancellation to remove, from the local audio data, an "echo" signal corresponding to the remote audio data, thus isolating local speech to be used for voice commands and/or the communication session from whatever other audio may exist in the environment of the user. As the acoustic echo cancellation may not remove the entire echo signal, the device may also perform residual echo suppression to suppress unwanted additional signals. When the audio to be removed includes some speech (which may be referred to as remote speech) and local speech is not represented in the local audio data (e.g., "far end single-talk)", the device may use a low gain value to suppress the unwanted additional signals included in the local audio data. When local speech is represented in the local audio data but remote speech is not represented in the remote audio data (e.g., "near end single-talk"), the device may use a high gain value to pass any speech included in the local audio data. However, when remote speech is represented in the remote audio data and local speech is represented in the local audio data (e.g., "double-talk"), a low gain value suppresses unwanted additional signals (e.g., remote speech or other residual echo) and a high gain value allows the desired signal to pass through (e.g., local audio data or near-end speech).

Double-talk occurs when a far end signal (e.g., remote audio data received from the remote device) and a near end signal (e.g., portions of local audio data that correspond to audio generated near the local device, such as speech or other audible sounds) are both active (e.g., average energy level is above a threshold value) at the same time. The device may determine that double-talk is occurring by detecting that double-talk conditions are present (e.g., determining that both the far end signal and the near end signal are active). For example, as the remote audio data corresponds to the far end signal, the device may determine that the far end signal is active when an energy level of the remote audio data is above a threshold value. Alternatively, the device may determine that the far end signal is active by generating estimated echo audio data based on the remote audio data and determining that an energy level of the estimated echo audio data is above the threshold value.

As the local audio data may represent both the near end signal and an echo of the far end signal, however, an energy level of the local audio data does not accurately correspond to whether the near end signal is active. Instead, the device may determine that the near end signal is active by removing the echo from the local audio data and/or based on a correlation between the local audio data and the far end signal. For example, the device may determine that the near end signal is active by generating isolated audio data (e.g., performing acoustic echo cancellation to remove the estimated echo audio data from the local audio data) and determining that an energy level of the isolated audio data is above the threshold value. As another example, the device may determine that the near end signal is active based on a ratio of the isolated audio data to the estimated echo data. Alternatively, the device may determine that the near end signal is active based on a correlation between the local audio data (or the isolated audio data) and the remote audio data (or the estimated echo audio data). For example, when the local audio data/isolated audio data is strongly correlated with the remote audio data/estimated echo audio data, the device may determine that the near end signal is not active, whereas when the local audio data/isolated audio data is not strongly correlated with the remote audio data/estimated echo audio data, the device may determine that the near end signal is active.

To improve residual echo suppression, devices, systems and methods are disclosed that detect when double-talk conditions are present in individual frequency ranges during a voice conversation and apply appropriate gain values, thus improving quality of audio data exchanged over the communication link. The system may determine that double-talk conditions are present (e.g., the near end signal and the far end signal are both active) in individual frequency bands by determining a correlation between input audio data from a microphone and estimated echo audio data associated with a loudspeaker for individual frequency bands (e.g., on a band-by-band basis). The correlation may be done using data in a frequency domain. For example, the system may determine that double-talk conditions are present within a first frequency band and not present within a second frequency band. Thus, the system may perform residual echo suppression using a first gain value (e.g., value close to 0, which suppresses audio data) for the first frequency band (e.g., during far end single-talk) and a second gain value (e.g., value close to 1, which passes audio data) for the second frequency band (e.g., during near end single-talk or double-talk if the near-end signal is significantly stronger than the far end echo). The system may determine binary gain values (e.g., values of 0 or 1) or continuous gain values (e.g., values between 0 and 1) and may dynamically modify the gain values based on the correlation. Thus the system may perform more dynamic echo suppression and improve the quality of the exchanged audio data.

FIG. 1 illustrates a high-level conceptual block diagram of a system 100 configured to perform residual echo suppression. Although FIG. 1, and other figures/discussion illustrate the operation of the system in a particular order, the steps described may be performed in a different order (as well as certain steps removed or added) without departing from the intent of the disclosure. As illustrated in FIG. 1, the system 100 may include a first device 110*a* that may be communicatively coupled to network(s) 10 and that may include a microphone array 112 and loudspeaker(s) 114. The first device 110*a* may be local to a first user 5 of a communication connection. The first device 110*a* may communicate with a second device 110*b* and/or server(s) 120 via the network(s) 10. The second device 110*b* may be local to a second user 7 of a communication connection but remote from the first device 110*a*. As operations discussed herein may focus on operations performed by the first device 110*a*, that device may be referred to as the "local" device while the second device 110*b*, used by another party remote to the first device, may be referred to as the "remote" device. (Note that the server(s) 120 may also be "remote" (e.g., in a different location) from the first device 110*a*.)

The first device 110*a* may be an electronic device configured to send audio data to and/or receive audio data. For ease of illustration, some audio data may be referred to as a signal, such as a playback signal x(t), an echo signal y(t), an echo estimate signal y'(t), a microphone signal z(t), an error signal m(t), an output signal n(t), or the like. However, the signals may be comprised of audio data and may be referred to as audio data (e.g., playback audio data x(t), echo audio data y(t), echo estimate audio data y'(t), microphone audio data z(t), error audio data m(t), output audio data n(t), etc.) without departing from the disclosure. The first device 110*a* may include one or more microphone(s) in the microphone array 112 and/or one or more loudspeaker(s) 114, although the disclosure is not limited thereto and the first device 110*a* may include additional components without departing from the disclosure. For ease of explanation, the microphones in the microphone array 112 may be referred to as microphone(s) 112 without departing from the disclosure.

During a communication session with the second device 110*b* and/or the server(s) 120, the first device 110*a* may receive playback audio data (e.g., remote audio data) from the second device 110*b*/server(s) 120 via the network(s) 10 and may generate output audio (e.g., playback audio) based on the playback audio data using the loudspeaker(s) 114. The playback audio/playback audio data may correspond to what the second user 7 has spoken to the second device 110*b*. Using the microphone(s) 112, the first device 110*a* may capture input audio as input audio data (corresponding to the speech of the first user 5 near the first device 110*a*) and may send the input audio data to the second device 110*b*/server(s) 120 via the network(s) 10. As used herein, audio data (e.g., playback audio data, input audio data, or the like) may correspond to a specific range of frequency bands. For example, as the communication session is typically between humans, the playback audio data and/or the input audio data may correspond to a human hearing range (e.g., 20 Hz-20 kHz), although the disclosure is not limited thereto.

In some examples, the first device 110*a* may send the input audio data to the second device 110*b* as part of a Voice over Internet Protocol (VoIP) communication session. For example, the first device 110*a* may send the input audio data to the second device 110*b* either directly or via server(s) 120 and may receive the remote audio data from the second device 110*b* either directly or via the server(s) 120. However, the disclosure is not limited thereto and in some examples, the first device 110*a* may send the input audio data to the server(s) 120 in order for the server(s) 120 to determine a voice command. For example, during a communication session the first device 110*a* may receive the remote audio data from the second device 110*b* and may generate the output audio based on the remote audio data. However, the input audio data may be separate from the communication session and may include a voice command directed to the server(s) 120. Therefore, the first device 110*a* may send the input audio data to the server(s) 120 and the server(s) 120 may determine a voice command represented in the input audio data and perform an action corresponding to the voice command (e.g., execute a command, send an instruction to the first device 110*a* and/or other devices to execute the command, etc.). In some examples, to determine the voice command the server(s) 120 may perform Automatic Speech Recognition (ASR) processing, Natural Language Understanding (NLU) processing and/or command processing. The voice commands may control the first device 110*a*, audio devices (e.g., play music over loudspeakers, capture audio using microphones, or the like), multimedia devices (e.g., play videos using a display, such as a television, computer, tablet or the like), smart home devices (e.g., change temperature controls, turn on/off lights, lock/unlock doors, etc.) or the like.

Prior to sending the input audio data to the second device 110*b*/server(s) 120, the first device 110*a* may perform acoustic echo cancellation (AEC) and/or residual echo suppression (RES) to isolate local speech captured by the microphone(s) 112 and/or to suppress unwanted audio data (e.g., echoes and/or noise). For example, the first device 110*a* may receive the remote audio data (e.g., playback signal x(t)) and may generate playback audio (e.g., echo signal y(t)) using the loudspeaker(s) 114. The playback signal x(t) may be referred to as a reference signal (e.g., reference audio data), a far end signal, loudspeaker data, or the like. The microphone(s) 112 may capture input audio (e.g., microphone signal z(t)), which may include the echo signal y(t), along with local speech s(t) (e.g., near end speech from a user) and noise n(t) (e.g., z(t)=y(t)+s(t)+n(t)).

To isolate the local speech s(t), the first device 110*a* may include an Acoustic Echo Canceller (AEC) that generates an echo estimate signal y'(t) based on the playback signal x(t) and removes the echo estimate signal y'(t) from the microphone signal z(t). As the AEC does not have access to the echo signal y(t), the echo estimate signal y'(t) is an attempt to model the echo signal y(t) based on the far end signal x(t). Thus, when the AEC removes the echo estimate signal y'(t) from the microphone signal z(t), the AEC is removing at least a portion of the echo signal y(t). Therefore, the AEC generates an output (e.g., error signal m(t)) that may include the near end speech s(t), the noise n(t) and portions of the echo signal y(t) caused by differences between the echo estimate signal y'(t) and the actual echo signal y(t) (e.g., m(t)=z(t)−y'(t)=s(t)+n(t)+(y(t)−y'(t))).

To further improve the audio data, the first device 110*a* may include a residual echo suppressor (RES) to dynamically suppress unwanted audio data (e.g., the noise n(t) and the portions of the echo signal y(t) that were not removed by the AEC). For example, when the playback signal x(t) is active and the local speech s(t) is not represented in the error signal m(t), the RES may attenuate the error signal m(t) to generate final output audio data r(t). This removes and/or reduces the unwanted audio data from the final output audio data r(t). In contrast, when local speech s(t) is represented in the error signal m(t), the RES may act as a pass-through filter and pass the error signal m(t) without attenuation, which avoids attenuating the local speech s(t). However, the disclosure is not limited thereto and the RES may partially attenuate the error signal m(t) without departing from the disclosure.

Typically, an RES as known in the art may operate based on a simple decision tree depending on whether the playback signal x(t) and/or the microphone signal z(t) is high or low (e.g., above or below a threshold value). The playback signal x(t) being active may correspond to far end speech being present, whereas the microphone signal z(t) being active may correspond to local speech s(t) being present. For example, when far end speech is not present (e.g., playback signal x(t) is below the threshold value), the RES may act as a pass through filter and pass the error signal m(t) without significant attenuation (e.g., attenuation value is close to a value of 1). That includes when the near end speech is not present (e.g., microphone signal z(t) is below the threshold value), which is referred to as "no talk," and when the local speech s(t) is present (e.g., microphone signal z(t) is above the threshold value), which is referred to as "near end single-talk." In contrast, when the far end speech is present (e.g., playback signal x(t) is above the threshold value) and the local speech s(t) is not present (e.g., microphone signal z(t) and/or output of AEC is below the threshold value), which is referred to as "far end single-talk," the RES may act as an attenuator and may attenuate the error signal m(t) (e.g., gain value is close to a value of 0). When the local speech s(t) is present (e.g., microphone signal z(t) and/or output of AEC is above the threshold value) and the far end speech is present (e.g., playback signal x(t) is above the threshold value), "double-talk" occurs. During double-talk, the RES typically passes the error signal m(t) without attenuation and/or attenuates all frequency bands similarly.

Figure 2:
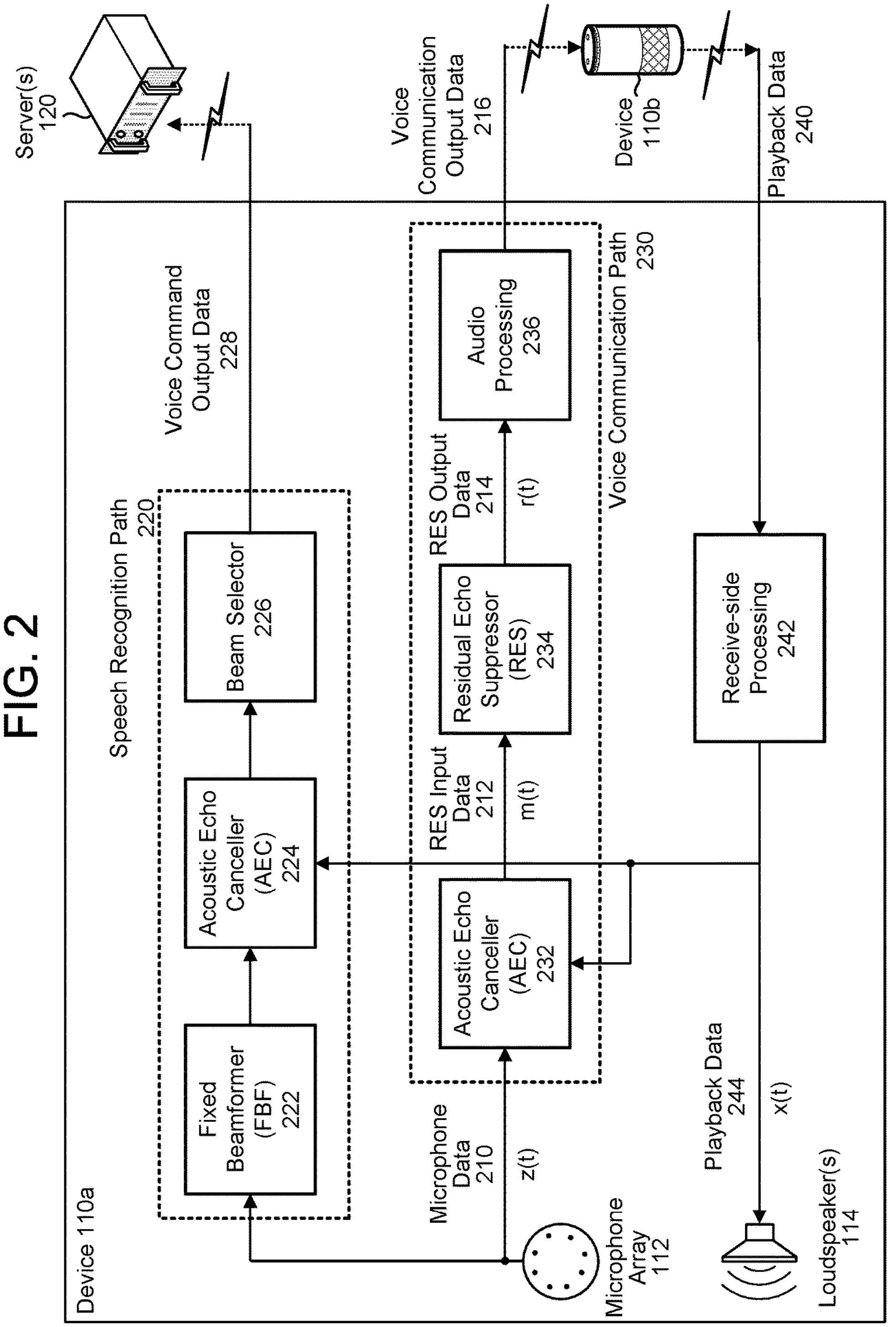
FIG. 2 illustrates an example of speech recognition and voice communication paths according to examples of the present disclosure.

As shown in FIG. 2, to improve residual echo suppression, the first device 110 may include a residual echo suppressor (RES) 234 that distinguishes between individual frequency bands. For example, the RES 234 may determine that double-talk conditions are present within a first frequency band and attenuate a first portion of the error signal m(t) while determining that double-talk conditions are not present within a second frequency band and passing a second portion of the error signal m(t). The techniques used to perform residual echo suppression will be described in greater detail below with regard to FIGS. 5-7.

FIG. 2 illustrates an example of speech recognition and voice communication paths according to examples of the present disclosure. As illustrated in FIG. 2, the first device 110*a* may receive playback data 240, which may be received from the second device 110*b* via the network(s) 10 and may be input to receive-side processing 242 to generate playback data x(t) 244. The first device 110*a* may use the loudspeaker(s) 114 to generate playback audio using the playback data x(t) 244.

While generating the playback audio, the first device 110*a* may capture input audio using a microphone array 112. For example, the microphone array 112 may generate microphone data z(t) 210, which may include local speech s(t), noise n(t) and a portion of the playback audio as echo data y(t). In some examples, the first device 110*a* may process the microphone data z(t) 210 using two different paths. For example, the first device 110*a* may use a speech recognition path 220 to generate voice command output data 228, which may be sent to the server(s) 120 to determine a voice command, and may use a voice communication path 230 to generate voice communication output data 216, which may be sent to the second device 110*b* during a communication session.

The speech recognition path 220 may include a fixed beamformer (FBF) 222, a first acoustic echo canceller (AEC) 224 and/or a beam selector 226, which may modify the microphone data z(t) 210 to generate the voice command output data 228. In contrast, the voice communication path 230 may include a second AEC 232, a residual echo suppressor (RES) 234 and audio processing 236, which may modify the microphone data z(t) 210 to generate the voice communication output data 216. While FIG. 2 illustrates the first AEC 224 and the second AEC 232 being discrete components, the disclosure is not limited thereto and a single AEC may perform both acoustic echo cancelling without departing from the disclosure.

As will be described in greater detail below, the second AEC 232 may receive the playback data x(t) 244 and may generate estimated echo data y'(t). The second AEC 232 may perform acoustic echo cancellation to remove the estimated echo data y'(t) from the microphone data z(t) 210 and generate RES input data m(t) 212 (e.g., error signal m(t)), which is input to the RES 234.

The RES 234 may perform residual echo suppression in a frequency domain to determine whether double-talk conditions are present in individual frequency bands. For example, the RES 234 may determine gain values corresponding to individual frequency bands and may attenuate the RES input data m(t) 212 based on the gain values to generate RES output data r(t) 214. The RES output data r(t) 214 may be processed by the audio processing 236 to generate the voice communication output data 216, which may be sent to the second device 110*b* as part of the communication session.

FIG. 1 illustrates a simplified example of how the double-talk decision is made for individual frequency bands. As illustrated in FIG. 1, the first device 110*a* may determine (130) estimated echo data y'(t) based on the playback data x(t). For example, the AEC 232 may determine the estimated echo data y'(t), although the disclosure is not limited thereto. The first device 110*a* may convert (132) the estimated echo data y'(t) from a time domain to a frequency domain to generate estimated echo data Y'(k). Similarly, the first device 110*a* may receive (134) microphone audio data from the microphone array 112 and may convert (136) the microphone audio data z(t) from the time domain to the frequency domain to generate microphone audio data Z(k).

The first device 110*a* may determine (138) a cross-power spectral density function between the estimated echo data Y'(k) and the microphone audio data Z(k), which corresponds to a cross-correlation of these sequences in the time domain. The first device 110*a* may determine (140) decision values for individual frequency bands using the cross-power spectral density function. Thus, an individual decision value corresponds to a correlation between the estimated echo data Y'(k) and the microphone audio data Z(k) in the selected frequency band. For example, a decision value above a decision threshold value indicates a strong correlation between the estimated echo data Y'(k) and the microphone audio data Z(k) (e.g., far end single-talk conditions are present), whereas a decision value below the decision threshold value indicates a weak correlation between the estimated echo data Y'(k) and the microphone audio data Z(k) (e.g., near end single-talk conditions or double-talk conditions are present). When the decision value is below the decision threshold value, the first device 110*a* may distinguish between near end single-talk or double-talk based on a power level of the estimated echo data Y'(k). For example, if the estimated echo data Y'(k) has a magnitude below an echo threshold value, the first device 110*a* may determine that there is only near end single-talk present. In contrast, if the estimated echo data Y'(k) has a magnitude above the echo threshold value, the first device 110*a* may determine that there is double-talk present.

Figure 3:
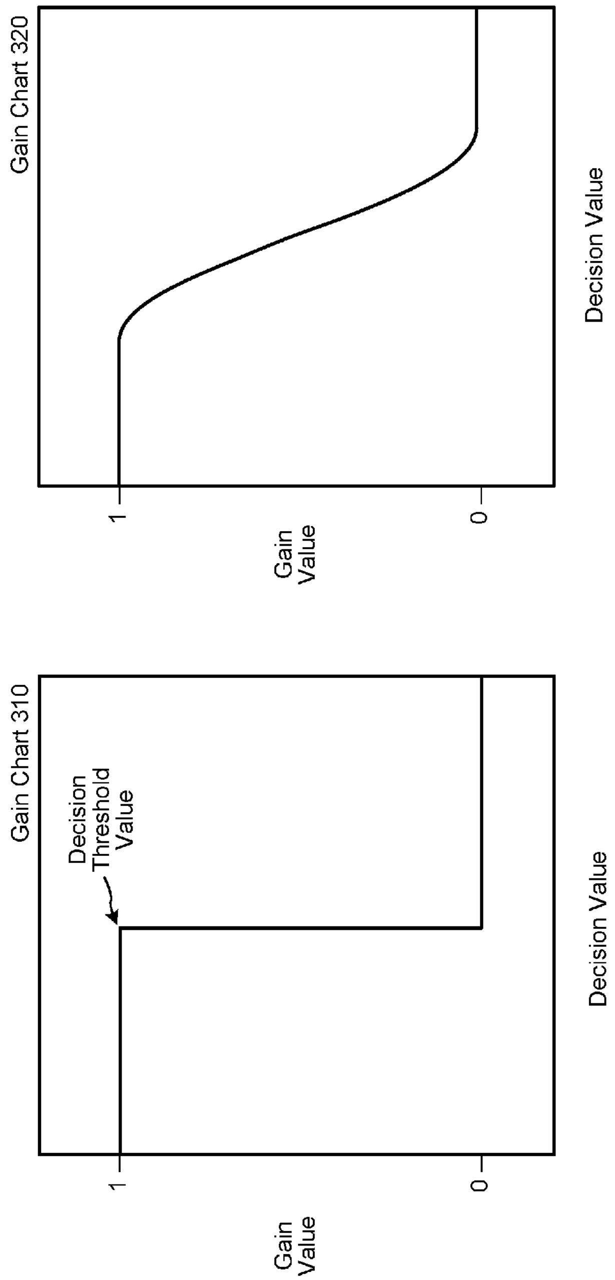
FIG. 3 illustrates a first example of binary gain values and a second example of continuous gain values according to examples of the present disclosure.

The first device 110*a* may determine (142) gain values based on the decision values. FIG. 3 illustrates a first example of binary gain values and a second example of continuous gain values according to examples of the present disclosure.

In some examples, the first device 110*a* may determine binary gain values (e.g., values of 0 or 1) based on the decision value and the magnitude of the estimated echo data Y'(k). For example, the first device 110*a* may select a gain value of zero for a selected frequency band if the decision value is below the decision threshold value or the magnitude of the estimated echo data Y'(k) is below the echo threshold value. Otherwise, the first device 110*a* may select a gain value of one for the selected frequency band. A gain value of zero corresponds to suppressing residual echo, as all audio data in the selected frequency band is suppressed. In contrast, a gain value of one corresponds to passing the audio data in the selected frequency band.

FIG. 3 includes a gain chart 310 illustrating how a decision value is used to determine whether a corresponding gain value is equal to a value of one or a value of zero. As illustrated in the gain chart 310, decision values below a decision threshold value are given a gain value of one, whereas decision values above the decision threshold value are given a gain value of zero. When the gain value is close to a value of one, the RES 234 acts similar to a pass-through filter for the selected frequency band, and an energy level of the RES output data R(k) is therefore similar to an energy level of the RES input data M(k). In contrast, when the gain value is close to a value of zero, the RES 234 attenuates the selected frequency band, such that an energy level of the RES output data R(k) is lower than an energy level of the RES input data M(k).

In some examples, the decision threshold value is fixed for all frequency bands and/or input signals. Thus, a correlation above the fixed decision threshold value corresponds to suppressing the frequency band (e.g., gain value of zero) and a correlation below the fixed decision threshold value corresponds to passing the frequency band (e.g., gain value of one). However, the disclosure is not limited thereto, and the decision threshold value may vary between frequency bands (e.g., higher decision threshold value for lower frequency bands, or vice versa) and/or input signals (e.g., higher decision threshold value at a first time and a lower decision threshold value at a second time) without departing from the disclosure.

While the gain chart 310 illustrates grouping the decision values into two bins (e.g., decision values below the decision threshold value correspond to a gain value of one and decision values above the decision value correspond to a gain value of zero), the disclosure is not limited thereto. Instead, the first device 110*a* may group the decision values into three or more bins using two or more decision threshold values without departing from the disclosure. For example, three bins may correspond to gain values of 0, 0.5 and 1; five bins may correspond to gain values of 0, 0.25, 0.5, 0.75 and 1; and so on.

Additionally or alternatively, the first device 110*a* may determine continuous gain values without departing from the disclosure. For example, as will be discussed in greater detail below with regard to FIG. 7, the first device 110*a* may use a mapping function (e.g., sigmoid function) to map the decision values to continuous values between 0 and 1. Thus, instead of either passing the audio data (e.g., gain value of 1) or suppressing the audio data in the selected frequency band (e.g., gain value of 0), the first device 110*a* may attenuate the audio data in the selected frequency band based on the amount of correlation between the estimated echo data Y'(k) and the microphone audio data Z(k). FIG. 3 includes a gain chart 320 illustrating continuous gain values, with a magnitude of the gain value inversely related to a magnitude of the decision value. While the gain chart 320 illustrates a specific example of mapping decision values to gain values, the disclosure is not limited thereto. Instead, in some examples the first device 110*a* may use two or more sigmoid functions and/or may modify parameters of the sigmoid functions based on the decision values, the magnitude of the estimated echo data Y'(k), a magnitude of the RES input data M(k), and/or other information available to the first device 110*a*, as will be described in greater detail below with regard to FIG. 7.

Figure 5:
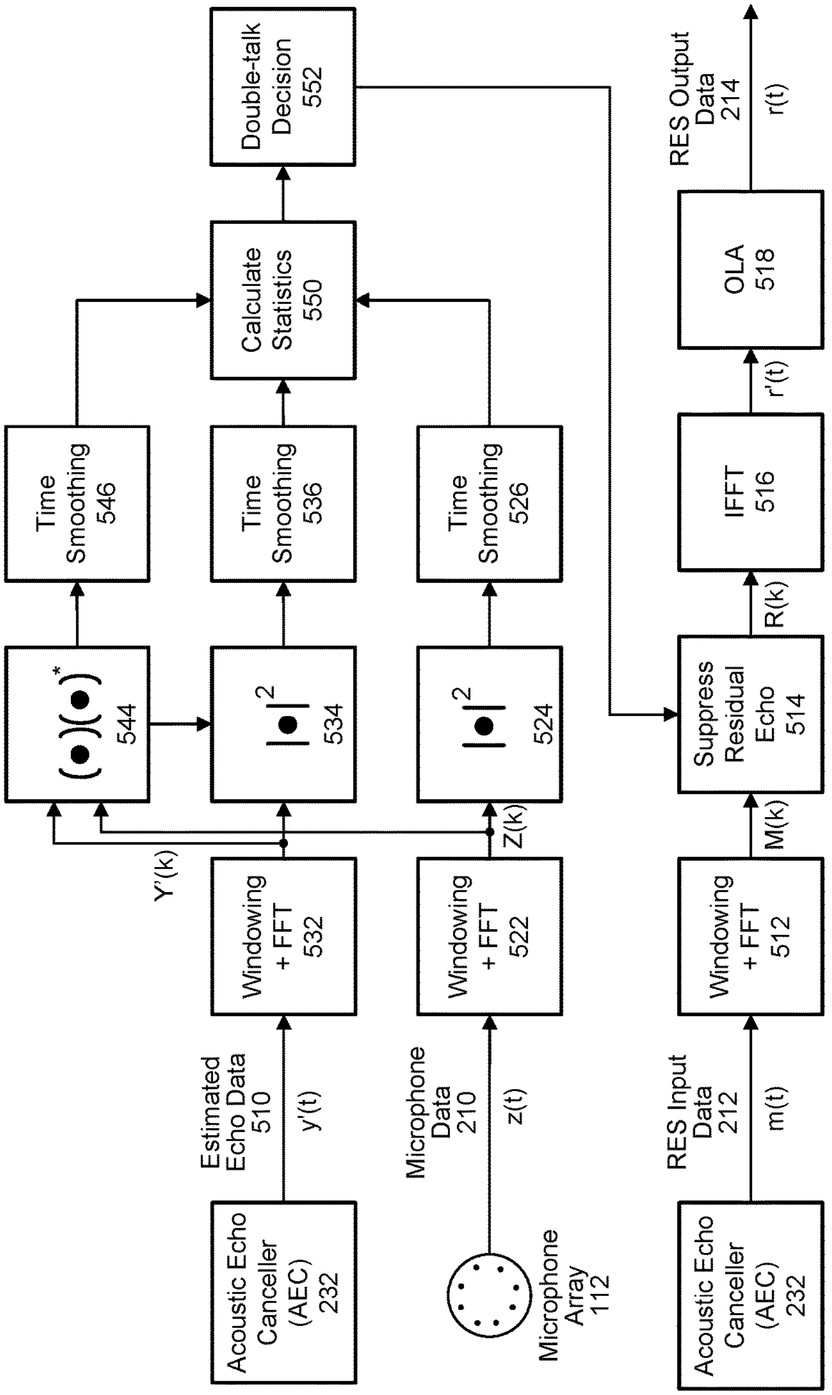
FIG. 5 illustrates an example of generating double-talk decisions used to suppress residual echo according to examples of the present disclosure.

The first device 110*a* may apply (144) the gain values to individual frequency bands to suppress residual echo. Residual echo suppression, which is discussed in greater detail below with regard to FIGS. 5-7, is performed by selectively attenuating, based on the individual frequency bands, input audio data to generate output audio data. For example, the first device 110*a* may determine a gain value (e.g., 0.7) for a portion of the RES input data M(k) corresponding to a specific frequency band (e.g., 100 Hz to 200 Hz) and may attenuate the portion of the RES input data M(k) based on the gain value to generate a portion of the RES output data R(k) corresponding to the specific frequency band. Thus, a gain value may be determined for each frequency band and therefore an amount of attenuation may vary based on the frequency band.

Figure 4:
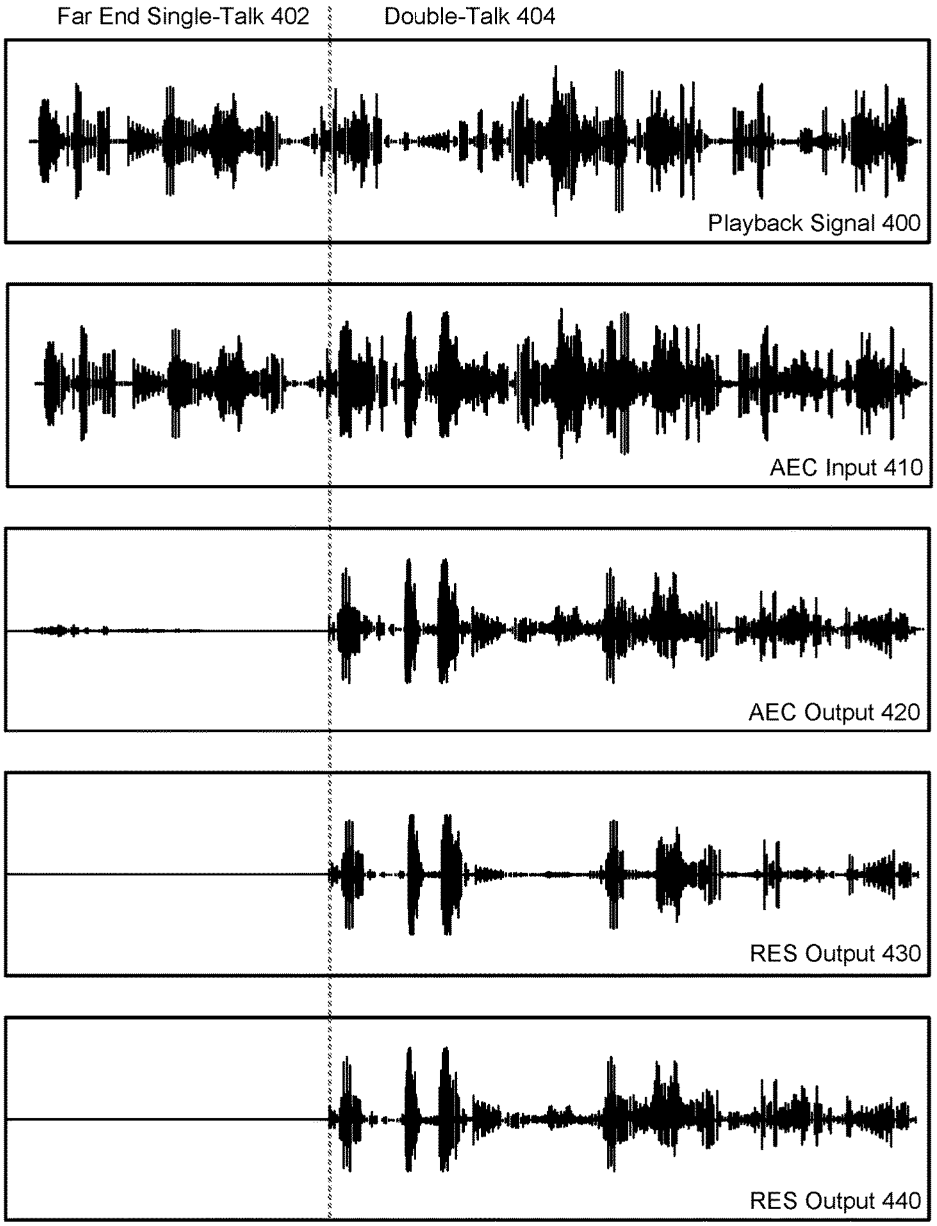
FIG. 4 illustrates example waveforms output from the residual echo suppressor according to examples of the present disclosure.

FIG. 4 illustrates example waveforms output from the residual echo suppressor according to examples of the present disclosure. During a period of far end single-talk 402, a playback signal 400 corresponds to AEC input 410, as the only audible sound captured by the microphone array 112 is associated with the playback signal 400. The AEC removes a majority of the echo signal y(t), but the AEC output 420 may include a small waveform corresponding to the echo signal y(t) (e.g., residual echo). For example, the residual echo may be represented in the AEC output 420 when the AEC doesn't converge (e.g., estimated echo signal y'(t) is not equal to the echo signal y(t)).

While FIG. 4 illustrates an ideal waveform that doesn't include noise n(t) or other environment noise, the disclosure is not limited thereto and in some examples the AEC output 420 will include additional sounds captured by the microphone array 112 during the far end single-talk 402. For example, even while a user is listening there may be environmental noise captured by the microphone array 112 that does not correspond to the echo signal y(t) and therefore would be included in the AEC output 420. In addition to waveforms corresponding to the environment noise itself, variations in the environmental noise may sometimes cause residual echo as it may prevent the AEC from converging on the echo signal y(t).

To suppress the residual echo, a conventional residual echo suppressor (RES) known to one of skill in the art may perform residual echo suppression and generate RES output 430. As illustrated by the RES output 430, the conventional RES completely attenuates the residual echo represented in the AEC output 420 during the far end single-talk 402. In addition, the RES 234 of the present disclosure may perform improved residual echo suppression and generate RES output 440, which also completely attenuates the residual echo represented in the AEC output 420 during the far end single-talk 402.

At a certain point, a user 5 local to the first device 110*a* may begin speaking while the playback signal 400 is active (e.g., a far end user 7 is speaking, music is playing, or the like), resulting in double-talk 404. As illustrated in FIG. 4, the AEC input 410 corresponds to microphone data z(t) captured by the microphone array 112 that includes an echo signal y(t) corresponding to the playback signal 400, along with additional waveforms that correspond to local speech s(t) and environment noise n(t). To isolate the local speech s(t), the AEC may perform acoustic echo cancellation and remove at least a portion of the echo signal y(t), resulting in the AEC output 420. As illustrated in FIG. 4, the AEC output 420 during double-talk 404 roughly corresponds to the local speech s(t) while also including some residual echo from the echo signal y(t).

To further isolate the local speech s(t) during double-talk 404, the conventional RES may perform residual echo suppression and generate the RES output 430. However, the conventional RES uses a full-band scheme, which determines whether double-talk conditions are present based on the entire frequency range (e.g., makes full-band a double-talk decisions). As a result of the full-band approach, the local speech s(t) may be suddenly attenuated from frame-to-frame, leading to "choppy" artifacts, where the local speech s(t) suddenly appears or disappears during double-talk. In addition, the full-band approach may result in additional distortion, as the conventional RES is designed to suppress residual echo and therefore may emphasize suppressing the AEC output 420 at the cost of suppressing desired signals like the local speech s(t). For example, at higher playback volume, the conventional RES may be too aggressive and interfere with the local speech s(t) in addition to suppressing the residual echo, which results in missing words, phonemes or even sentences in the RES output 430. As illustrated in FIG. 4, the RES output 430 may suppress a majority of the AEC output 420, leaving only the larger waveforms, which may degrade a quality of the local speech s(t).

Double-talk conditions vary not only with respect to time, but also with respect to frequency. For example, the fact that the signal conditions favor double-talk decisions in some frequency regions doesn't necessarily mean that the same decision should be used in other frequency regions. In contrast to the conventional RES, the improved RES 234 performs residual echo suppression by determining whether double-talk conditions are present for individual frequency bands (e.g., frequency bins) over time. By determining whether double-talk conditions are present for individual frequency bands, the improved RES 234 effectively suppresses residual echo while maintaining continuity during double-talk. For example, the local speech s(t) may be more consistent frame-to-frame (e.g., not suddenly attenuated), without the "choppy" artifacts present in the RES output 430 where the local speech s(t) suddenly appears or disappears during double-talk 404. In addition, the improved RES 234 may be less aggressive in suppressing the AEC output 420, reducing the amount that the local speech s(t) is attenuated in the RES output 440. As illustrated in FIG. 4, the RES output 440 may include additional data that is not represented in the RES output 430, such as smaller waveforms between the larger waveforms, which improves a quality of the local speech s(t).

As discussed above, an amount of residual echo suppression may vary between near end single-talk (e.g., local speech s(t) is present and far end speech is not present), far end single-talk (e.g., far end speech is present and local speech s(t) is not present), and double-talk (e.g., local speech s(t) and far end speech are both present) conditions. As the far end speech corresponds to the playback data x(t) 244, the first device 110*a* may easily determine whether the far end speech is present based on an energy level of the playback data x(t) 244. For example, the first device 110*a* may determine that the far end speech is present when the playback data x(t) 244 is active (e.g., an average energy level of the playback data x(t) 244 is above the threshold value) and may determine that the far end speech is not present when the playback data x(t) 244 is not active (e.g., an average energy level of the playback data x(t) 244 is below a threshold value). Therefore, the first device 110*a* may easily differentiate between near end single-talk and far end single-talk or double-talk based on the energy level of the playback data x(t) 244.

However, the microphone data z(t) 210 does not correspond to the local speech s(t), as the microphone data z(t) 210 also includes the echo signal y(t) and the noise n(t). Therefore, the first device 110*a* may not easily determine when the local speech s(t) is represented in the microphone data z(t) 210. For example, the microphone data z(t) 210 may be active (e.g., average energy level above the threshold value) due to poor acoustic echo cancellation and/or a lot of noise. Thus, the microphone data z(t) 210 is active but the local speech s(t) is not represented.

When the playback data x(t) 244 is active, the first device 110*a* may determine whether local speech s(t) is not present (e.g., during far end single-talk) or present (e.g., during double-talk) based on a correlation between the playback data x(t) 244 and the microphone data z(t) 210. For example, a correlation value above a threshold value indicates that the microphone data z(t) 210 is highly correlated to the playback data x(t) 244, which corresponds to far end single-talk (e.g., microphone data z(t) 210 corresponds to the echo y(t) but not to local speech s(t)). Similarly, a correlation value below the threshold value indicates that the microphone data z(t) 210 is not correlated to the playback data x(t) 244, which corresponds to double-talk (e.g., microphone data z(t) 210 corresponds to local speech s(t)).

FIG. 5 illustrates an example of generating double-talk decisions used to suppress residual echo according to examples of the present disclosure. As illustrated in FIG. 5, the first device 110*a* may improve residual echo suppression by determining whether double-talk conditions are present in individual frequency bands. For example, the RES 234 may convert the estimated echo data y'(t) 510, the microphone data z(t) 210, and the RES input data m(t) 212 from the time domain to the frequency domain.

As illustrated in FIG. 5, the RES 234 may perform windowing and a fast Fourier transform (FFT) 512 to the RES input data m(t) 212 to generate RES input data M(k), may perform windowing and FFT 522 to the microphone data z(t) 210 to generate microphone data Z(k), and may perform windowing and FFT 532 to the estimated echo data y'(t) 510 to generate estimated echo data Y'(k). The windowing may be performed using techniques known to one of skill in the art, such as using a symmetric triangular windowing function, and the frequency band k varies from 0 to $N_f-1$, with $N_f=N_{FFT}/2$. Thus, we assume that each frame has N samples, that two frames are combined for FFT and hence $N_{FFT}=2N$. For ease of explanation, the spectral data (e.g., M(k), Z(k), Y'(k), etc.) is illustrated based on a frequency band k. However, the spectral data can be described relative to the frequency band k and a frame index m without departing from the disclosure (e.g., M[k, m], Z[k, m], Y'[k, m], etc.).

The RES 234 may determine a first power spectral density (PSD) function 524 based on the microphone data Z(k) and may perform time smoothing 526 to smooth the first PSD function over time. For example, the first PSD function and the smoothed first PSD function may be calculated using the following equations:

$$\mathrm{PSD}_z[k,m]=|Z[k,m]|^2 \tag{1}$$

$$\mathrm{PSD}_{zs}[k,m]=\alpha\cdot\mathrm{PSD}_{zs}[k,m-1]+(1-\alpha)\mathrm{PSD}_z[k,m] \tag{2}$$

where k is a selected frequency band, m is a frame index, Z[k, m] is the microphone data in the frequency domain, $\mathrm{PSD}_z[k, m]$ is an instantaneous PSD function based on the microphone data Z(k), $\mathrm{PSD}_{zs}[k, m]$ is a smoothed PSD function based on the microphone data Z(k), and $\alpha\in[0, 1]$ is a smoothing factor. For example, increasing the smoothing factor α increases a weight associated with a previous data point (e.g., $\mathrm{PSD}_{zs}[k, m-1]$) relative to a current data point (e.g., $\mathrm{PSD}_z[k, m]$). A power spectral density function describes the distribution of power into frequency components composing a signal. For example, the power spectral density $\mathrm{PSD}_z[k, m]$ of the microphone data Z(k) describes the distribution of power of the microphone data Z(k) into frequency components within the selected frequency band k. The first device 110*a* may determine the power spectral density function using techniques known to one of skill in the art without departing from the disclosure.

Similarly, the RES 234 may determine a second PSD function 534 based on the estimated echo data Y'(k) and may perform time smoothing 536 to smooth the second PSD function over time. For example, the second PSD function and smoothed second PSD function may be calculated using the following equations:

$$\mathrm{PSD}_Y[k,m]=|Y'[k,m]|^2 \tag{3}$$

$$\mathrm{PSD}_{Ys}[k,m]=\alpha\cdot\mathrm{PSD}_{Ys}[k,m-1]+(1-\alpha)\mathrm{PSD}_Y[k,m] \tag{4}$$

where k is a selected frequency band, m is a frame index, Y'[k, m] is the estimated echo data in the frequency domain, $\mathrm{PSD}_Y[k, m]$ is an instantaneous PSD function based on the estimated echo data Y'(k), $\mathrm{PSD}_{Ys}[k, m]$ is a smoothed PSD function based on the estimated echo data Y'(k), and $\alpha\in[0, 1]$ is a smoothing factor. For example, increasing the smoothing factor α increases a weight associated with a previous data point (e.g., $\mathrm{PSD}_{Ys}[k, m-1]$) relative to a current data point (e.g., $\mathrm{PSD}_Y[k, m]$).

Finally, the RES 234 may determine a cross-power spectral density (cross-PSD) function 544 between the microphone data Z(k) and a complex conjugate of the estimated echo data Y'(k) and may perform time smoothing 546 to smooth the cross-PSD function over time. For example, the cross-PSD function and smoothed cross-PSD function may be calculated using the following equations:

$$\mathrm{CPSD}[k,m]=Z[k,m]Y'^*[k,m] \tag{5}$$

$$\mathrm{CPSD}_s[k,m]=\alpha\cdot\mathrm{CPSD}_s[k,m-1]+(1-\alpha)\mathrm{CPSD}[k,m] \tag{6}$$

where k is a selected frequency band, m is a frame index, Z[k, m] is the microphone data in the frequency domain, Y'*[k, m] is a complex conjugate of the estimated echo data in the frequency domain, CPSD [k, m] is an instantaneous cross-PSD function between the microphone data and the estimated echo data, $\mathrm{CPSD}_s[k, m]$ is the cross-PSD function smoothed in time, and $\alpha\in[0, 1]$ is a smoothing factor. For example, increasing the smoothing factor α increases a weight associated with a previous data point (e.g., $\mathrm{CPSD}_s[k, m-1]$) relative to a current data point (e.g., CPSD [k, m]). The first device 110*a* may determine the cross power spectral density (cross-PSD) function between the microphone data Z(k) and the estimated echo data Y'(k) using techniques known to one of skill in the art. A cross-PSD is a coherence or cross-correlation between two signals. For example, the cross-PSD between the microphone data Z(k) and the estimated echo data Y'(k) determines the amount of correlation between the microphone data Z(k) and the estimated echo data Y'(k).

Using Equations (1) to (6), the RES 234 may calculate statistics 550. For example, the RES 234 may determine a decision value using a normalized cross-PSD function calculated using the following equation:

$$CPSD_n[k,m]=\frac{\mathrm{Re}\{CPSD_s[k,m]\}}{\sqrt{PSD_{zs}[k,m]PSD_{Ys}[k,m]}+\delta} \tag{7}$$

where k is a selected frequency band, m is a frame index, $\mathrm{CPSD}_n[k, m]$ is the normalized cross-PSD function, $\mathrm{Re}\{\mathrm{CPSD}_s[k, m]\}$ are the real components of the smoothed cross-PSD function, $\mathrm{PSD}_{zs}[k, m]$ is the first PSD function associated with the microphone data Z(k), $\mathrm{PSD}_{Ys}[k, m]$ is the second PSD function associated with the estimated echo data Y'(k), and delta δ is a small quantity to avoid dividing by zero.

Thus, the normalized cross-PSD is the decision value used to determine whether double-talk conditions are present in an individual frequency band. A relatively high value for the normalized cross-PSD corresponds to a high correlation, indicating that the microphone data Z(k) is highly correlated to the estimated echo Y'(k) for the selected frequency band, which occurs during far end single-talk. In contrast, a relatively low value for the normalized cross-PSD corresponds to a low correlation, indicating that the microphone data Z(k) is not correlated to the estimated echo Y'(k) for the selected frequency band, which occurs during double-talk.

The RES 234 may determine a double-talk decision 552 for each frequency band and generate gain values, as described above with regard to FIG. 3. The gain values may be used to suppress residual echo 514. For example, the RES input data M(k) may be multiplied by the gain values to generate RES output data R(k). The RES output data R(k) may be converted from the frequency domain to the time domain using an inverse fast Fourier transform (IFFT) 516 to generate RES output data r'(t), and an overlap-and-add (OLA) 518 method may be applied to the RES output data r'(t) to generate RES output data r(t) 214.

In some examples, the RES 234 may determine the gain values using a binary binning process, such that the gain values are equal to a value of zero or one. For example, decision values below a decision threshold value correspond to a gain value of one, which occurs during double-talk, while decision values above the decision threshold value correspond to a gain value of zero, which occurs during far end single-talk. Gain values may be determined using the following equation:

$$\text{Gain}[k, m] = \begin{cases} 1, & \text{if } CPSD_n[k, m] < D_{th} \text{ or } PSD_{Ys}[k, m] < F_{th} \\ 0, & \text{otherwise} \end{cases} \quad (8)$$

where k is a selected frequency band, m is a frame index, Gain[k, m] is a gain function, $CPSD_n$[k, m] is the normalized cross-PSD function, $D_{th}$ is a decision threshold value, $PSD_{Ys}$[k, m] is the second PSD function corresponding to the estimated echo Y(k) smoothed over time, and $F_{th}$ is a far end threshold value. For example, when the playback signal X(k) is inactive (e.g., energy level below a threshold value), the second PSD function $PSD_{Ys}$[k, m] is below the far end threshold value, indicating that double-talk conditions are not present. Thus, the RES 234 may use a gain value of one and pass the RES input data M(k) for the selected frequency band as there is no echo included in the RES input data M(k). In contrast, if the second PSD function $PSD_{Ys}$[k, m] is above the far end threshold value, echo may be present and the RES 234 only uses the gain value of one if the decision value is below the decision threshold value (e.g., low correlation between estimated echo data Y'(k) and the microphone data Z(k)).

Figure 6A:
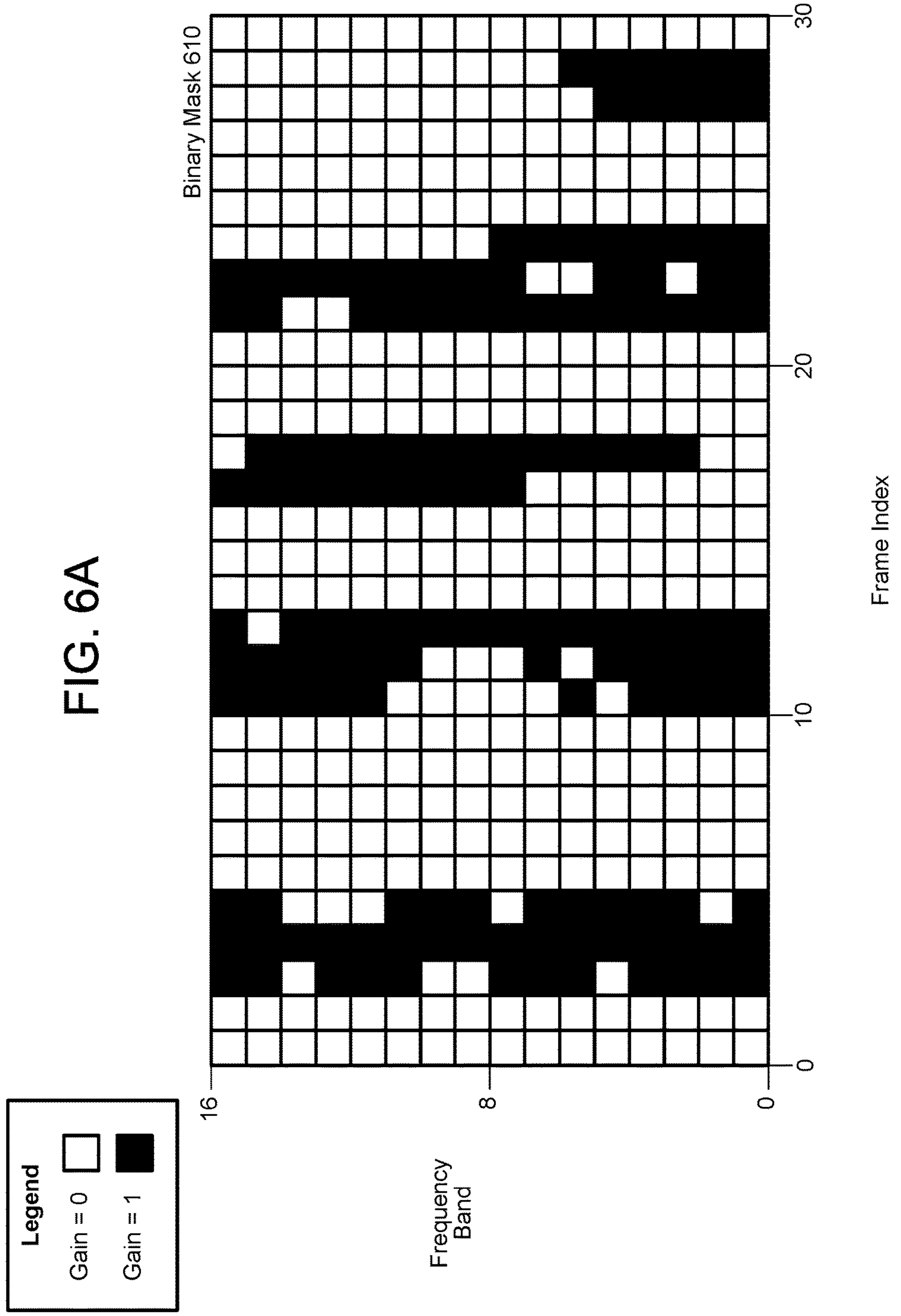
FIGS. 6A-6B illustrate examples of generating a binary mask according to examples of the present disclosure.
Figure 6B:
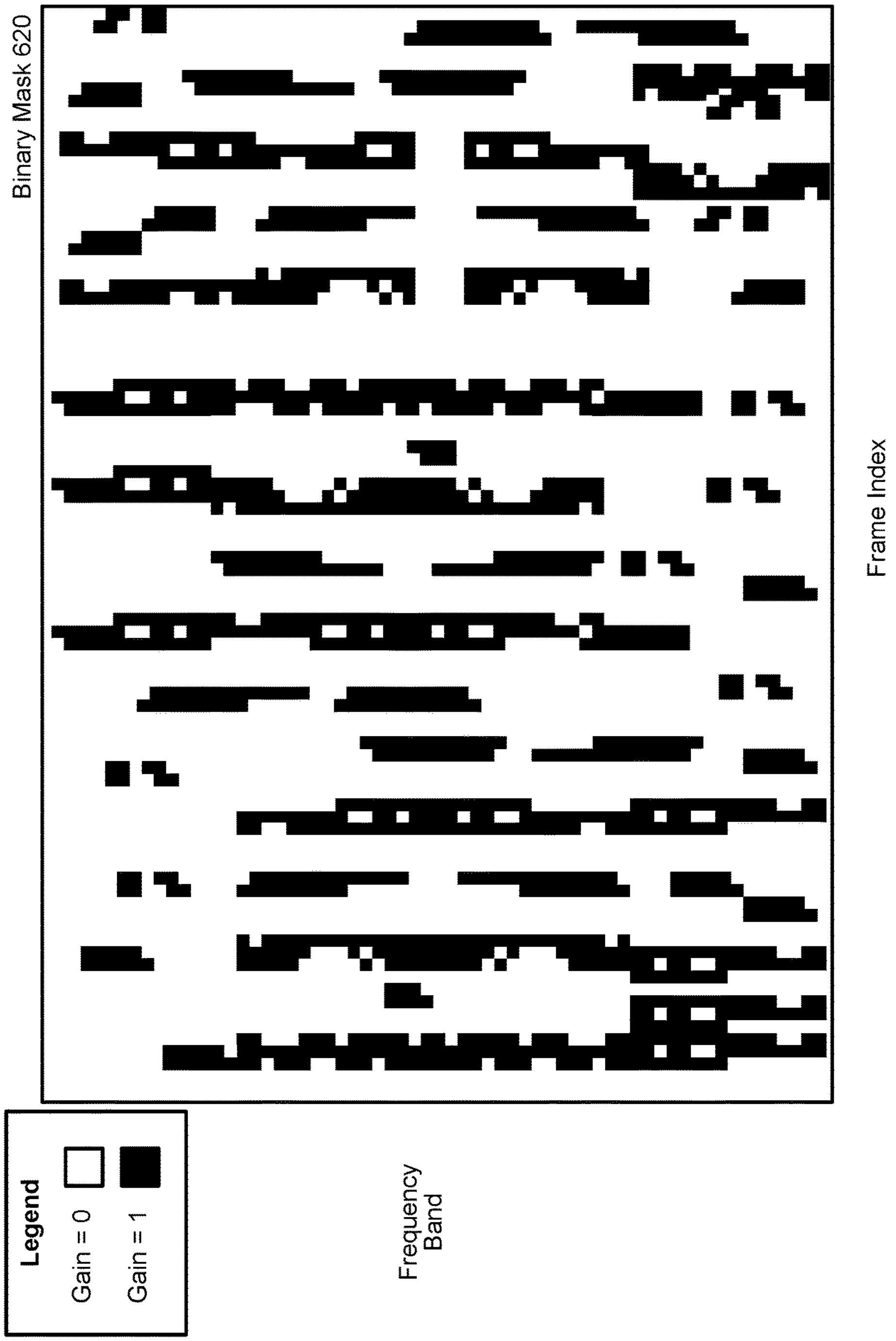
Figure 7:
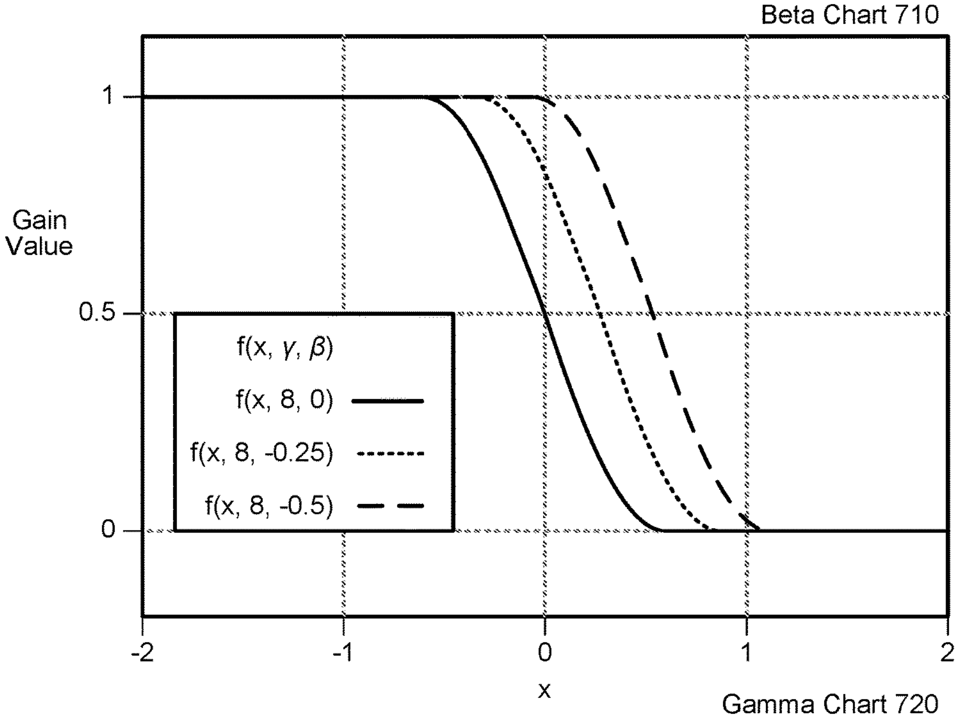
FIG. 7 illustrates examples of different mapping functions used to generate continuous gain values according to examples of the present disclosure.
Figure 7:
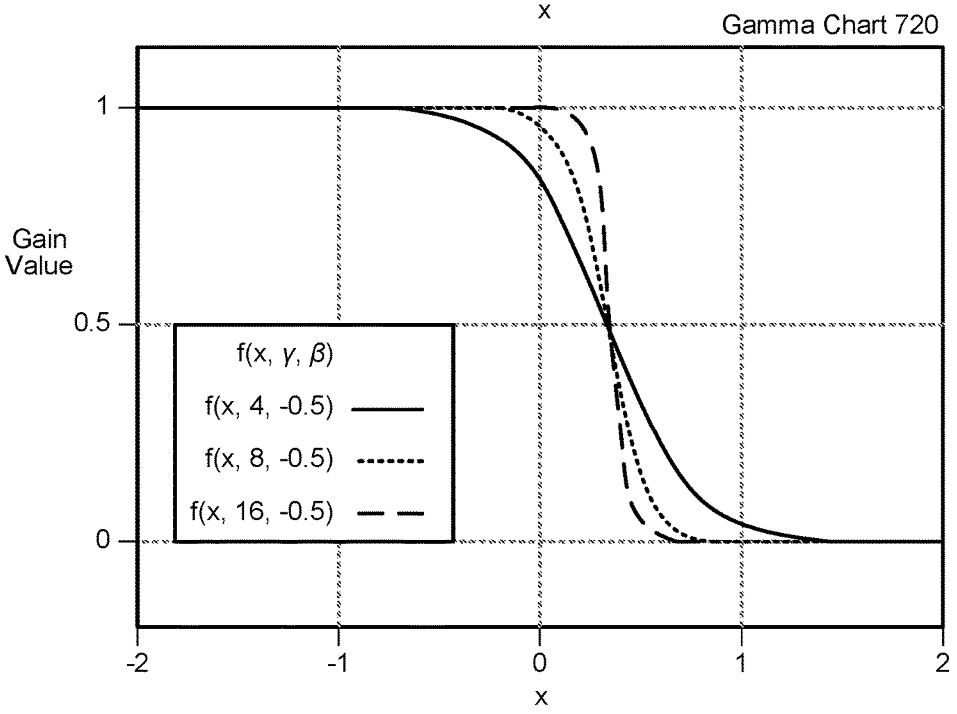

FIGS. 6A-6B illustrate examples of generating a binary mask according to examples of the present disclosure. While Equation (8) determines individual gain values for each frequency band and frame index, the RES 234 may determine a binary mask for a plurality of frequency bands at a time. As illustrated in FIG. 6A, a binary mask 610 represents the gain values for each frequency band (e.g., vertical axis) over a series of frame indexes (e.g., horizontal axis), with black corresponding to a gain value of one and white corresponding to a gain value of zero. For ease of illustration, the binary mask 610 includes only a few frequency bands (e.g., 16). However, the RES 234 may determine gain values for any number of frequency bands without departing from the disclosure. For example, FIG. 6B illustrates a binary mask 620 corresponding to 64 frequency bands, although the RES 234 may determine gain values for 128 frequency bands or more without departing from the disclosure.

In some examples, the RES 234 may modify the gain values to improve the residual echo suppression decisions by considering other frequency bands and/or frame indexes. For example, the RES 234 may modify gain values based on gain values associated with a majority of frequency bands, neighboring frequency bands, and/or previous frames.

As a first example, the RES 234 may determine that a majority of frequency bands are associated with a particular gain value and may extend the gain value for every frequency band. For example, if a majority of frequency bands (e.g., 90% or higher) have a gain value of one (e.g., corresponding to passing input audio data during double-talk), the RES 234 may set gain values for all frequency bands to a value of one, making a full-band double-talk decision to pass the input audio data. Similarly, if a majority of the frequency bands have a gain value of zero (e.g., corresponding to suppressing input audio data during far end single-talk), the RES 234 may set gain values for all frequency bands to a value of zero, making a full-band double-talk decision to suppress the input audio data.

As a second example, the RES 234 may consider neighboring frequency bands when determining a gain value for a selected frequency band. As loudspeakers are nonlinear, a single frequency component may generate other frequency components that result in acoustic echo leaking to neighboring frequency bands. To improve an effectiveness of suppressing the residual echo, when the RES 234 determines to attenuate a selected frequency band (e.g., set gain value to zero), the RES 234 may also apply at least some attenuation to neighboring frequency bands. For example, if the RES 234 determines that a first frequency band corresponds to far end single-talk and therefore the residual echo can be suppressed (e.g., first gain value set to zero), the RES 234 may modify a second gain value of a second frequency band that neighbors the first frequency band. Thus, even though the second frequency band corresponds to double-talk and has an initial second gain value of one, the RES 234 may set the second gain value to a value of zero (e.g., full attenuation) or may reduce the initial second gain value by a percentage based on the first frequency band being suppressed.

As a third example, the RES 234 may implement a hangover mechanism to extend a suppression decision for a period of time. For example, if the RES 234 determines that a current frame corresponds to far end single-talk and sets a gain value to zero, the RES 234 may apply the same decision for a fixed period of time (e.g., 5 subsequent frames) despite not detecting far end single-talk during the fixed period of time. Thus, when the RES 234 determines to suppress a frame, the RES 234 also suppresses subsequent frames during a hangover period. As acoustic echo is often present in future frames, the hangover mechanism may improve residual echo suppression. Additionally or alternatively, the RES 234 may smooth the suppression decision in time, such as by taking an average gain value for a fixed number of frames or the like.

The RES 234 may generate the RES output data R(k) using the following equation:

$$R[k, m] = \begin{cases} M[k, m], & \text{if Gain}[k, m] = 1 \\ 0, & \text{otherwise} \end{cases} \quad (9)$$

where k is a selected frequency band, m is a frame index, R [k, m] is the RES output data, M [k, m] is the RES input data, and Gain[k, m] is the gain function.

Additionally or alternatively, the RES 234 may determine continuous gain values using a sigmoid function. For example, the decision values may be mapped to continuous gain values, with a high decision value corresponding to a lower gain value and a low decision value corresponding to a higher gain value. The decision values may be mapped to continuous gain values using the following equation:

$$\text{Gain}[k,m]=f(\text{CPSD}_n[k,m]) \tag{10}$$

where k is a selected frequency band, m is a frame index, Gain[k, m] is the gain function, f( ) is a sigmoid function, and $\text{CPSD}_n[k, m]$ is the decision value (e.g., normalized cross-PSD function). The sigmoid function f( ) may be given by:

$$f(x) = \frac{1}{1+e^{\gamma(x+\beta)}} \tag{11}$$

where f(x) is the sigmoid function, x is the decision value, gamma γ is a first parameter, and beta β is a second parameter. The RES 234 may vary gamma γ and beta β in the sigmoid function to control the mapping characteristic and generate gain values differently, as will be described in greater detail below with regard to FIG. 7. The gain values are then multiplied by the RES input data M(k) to generate RES output data R(k) using the following equation:

$$R[k,m]=M[k,m]*\text{Gain}[k,m] \tag{12}$$

While FIGS. 6A-6B illustrate binary masks, the disclosure is not limited thereto and the gain values may be represented as continuous masks, with black corresponding to a gain value of one, white corresponding to a gain value of zero, and varying shades of gray corresponding to intermediate gain values between zero and one.

FIG. 7 illustrates examples of different mapping functions used to generate continuous gain values according to examples of the present disclosure. As shown in FIG. 7, beta chart 710 illustrates examples of different mapping functions (e.g., sigmoid functions) when varying values of beta β. The sigmoid functions may be represented as f(x, γ, β) and every sigmoid function illustrated in the beta chart 710 has a gamma γ value of 8. For example, a first sigmoid function is illustrated having a beta β value of 0, a second sigmoid function is illustrated as having a beta β value of −0.25, and a third sigmoid function is illustrated as having a beta β value of −0.5. As illustrated in the beta chart 710, changing the value of beta β moves the sigmoid function horizontally along the x-axis.

In contrast, gamma chart 720 illustrates examples of different sigmoid functions when varying values of gamma γ. The sigmoid functions may be represented as f(x, γ, β), and every sigmoid function illustrated in the gamma chart 720 has a beta β value of −0.5. For example, a first sigmoid function is illustrated having a gamma γ value of 4, a second sigmoid function is illustrated as having a gamma γ value of 8, and a third sigmoid function is illustrated as having a gamma γ value of 16. As illustrated in the gamma chart 720, changing the value of gamma γ changes a slope of the sigmoid function, with a larger gamma γ value corresponding to a much steeper slope.

By varying the values for beta β and gamma γ, the RES 234 may map the decision values to different gain values. In some examples, these values may be tuned to maximize sound quality and may be fixed during run-time operation of the RES 234. For example, optimizing the values for gamma γ and beta β may be done offline and/or during manufacturing of the first device 110*a*. However, the disclosure is not limited thereto and the values for gamma γ and beta β may vary without departing from the disclosure. For example, the RES 234 may use multiple sigmoid functions and/or different values for gamma γ and beta β based on signal conditions.

To illustrate an example, the RES 234 may use a first sigmoid function during far end single-talk conditions (e.g., to increase residual echo suppression) and a second sigmoid function during double-talk (e.g., to improve sound quality of the local speech s(t)). Thus, the RES 234 may determine whether to use the first sigmoid function or the second sigmoid function based on the near end power (e.g., average energy level of the microphone data z(t) 210, the RES input data m(t) 212, or the like) and the far end power (e.g., average energy level of the playback data x(t) 244, the estimated echo data y'(t), or the like). For example, the RES 234 may compare an average energy level of the RES input data m(t) (e.g., output of the AEC 232) to an average energy level of the estimated echo data y'(t), selecting a sigmoid function with greater suppression (e.g., increase beta value to shift sigmoid function to the left) when the RES input data m(t) has a lower average energy level than the estimated echo data y'(t).

In some examples, the RES 234 may select the sigmoid function for all frequency bands (e.g., full-band decision) using the time domain signals (e.g., z(t), m(t), x(t), y'(t), etc.). However, the disclosure is not limited thereto and the RES 234 may select the sigmoid function for individual frequency bands using frequency domain signals (e.g., Z(k), M(k), X(k), Y'(k), etc.). Additionally or alternatively, the RES 234 may select from three or more sigmoid functions and/or vary the parameters of the sigmoid function (e.g., select values for gamma γ and beta based on a ratio of the RES input data m(t) to the estimated echo data y'(t)) without departing from the disclosure. As another example, the RES 234 may modify the gain value by multiplying the gain value by an attenuation factor based on the ratio of the RES input data m(t) to the estimated echo data y'(t). For example, increasing suppression corresponds to an attenuation value between zero and one, whereas decreasing suppression corresponds to an attenuation value greater than one.

Figure 8:
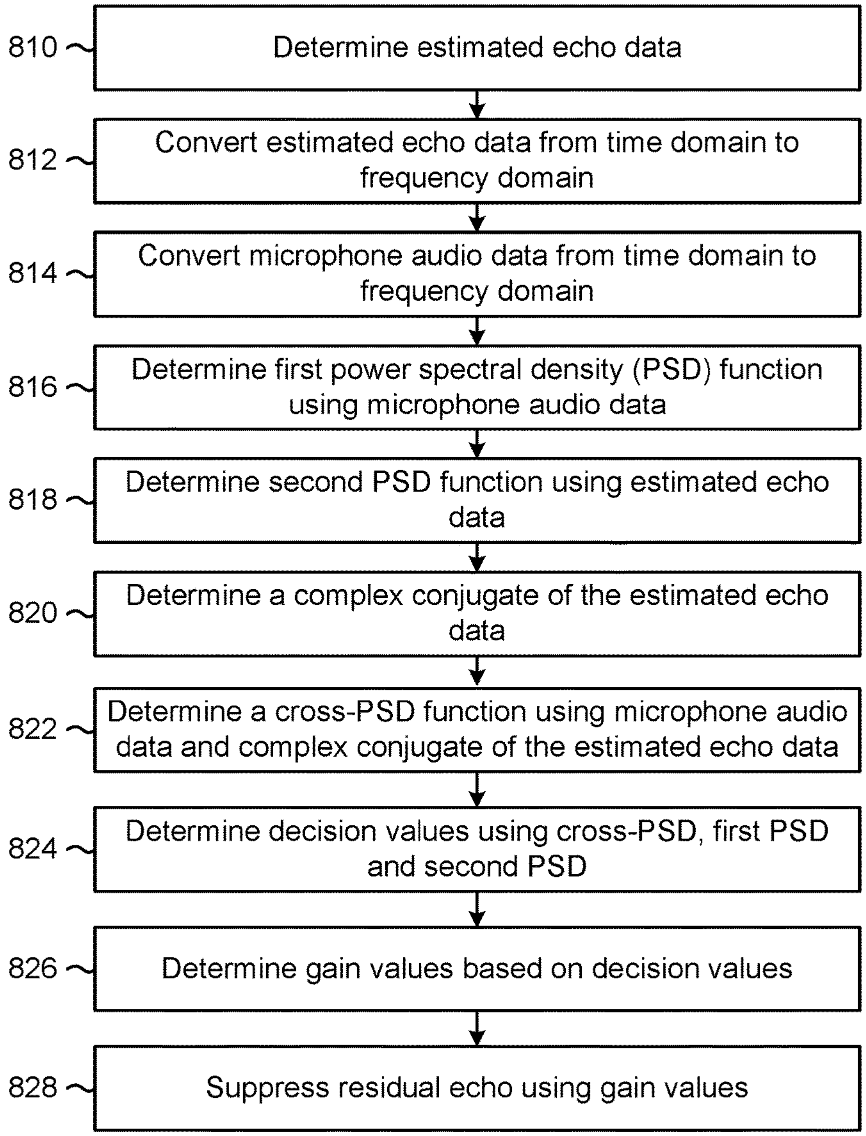
FIG. 8 is a flowchart conceptually illustrating a method for determining a gain value according to examples of the present disclosure.

FIG. 8 is a flowchart conceptually illustrating a method for determining a gain value according to examples of the present disclosure. As illustrated in FIG. 8, the device 110 may determine (810) estimated echo data corresponding to audible sound output by the loudspeaker(s) 114 and may convert (812) the estimated echo data y'(t) from a time domain to a frequency domain. For example, the device 110 may perform windowing and a fast Fourier transform (FFT) to the estimated echo data y'(t) to generate estimated echo data Y'(k).

The device 110 may receive microphone audio data z(t) from a microphone array 112 and use similar techniques to convert (814) the microphone audio data z(t) from the time domain to the frequency domain. For example, the device 110 may perform windowing and FFT to the microphone data z(t) to generate microphone data Z(k).

The device 110 may determine (816) a first power spectral density (PSD) function using the microphone audio data Z(k), as discussed in greater detail above with regard to Equations (1)-(2).

The device 110 may determine (818) a second PSD function using the estimated echo data Y'(k), as discussed in greater detail above with regard to Equations (3)-(4). The device 110 may determine (820) a complex conjugate of the estimated echo data Y'(k). For example, the complex conjugate of a complex number is the number with equal real part and imaginary part equal in magnitude but the complex value is opposite in sign.

The device 110 may determine (822) a cross-PSD function using microphone audio data and the complex conjugate of the estimated echo data, as discussed in greater detail above with regard to Equations (5)-(6).

The device 110 may determine (824) decision values using the cross-PSD function, the first PSD function and the second PSD function. For example, the decision values may correspond to a normalized cross-PSD function, described in greater detail above with regard to Equation (7).

The device 110 may determine (826) gain values based on the decision values. In some examples, the device 110 may generate binary outputs (e.g., gain values of either 0 or 1) using a threshold value. For example, decision values below the threshold value correspond to a gain value of one (e.g., input to the RES 234 is not suppressed for the frequency band) and decision values above the threshold value correspond to a gain value of zero (e.g., input to the RES 234 is suppressed for the frequency band). In other examples, the device 110 may generate continuous outputs (e.g., gain values between 0 and 1) using a sigmoid function. For example, the decision values may be used as inputs to the sigmoid function, which may map the decision values to gain values between zero and one. Thus, an amount of suppression for each frequency band is based on the specific decision value (e.g., value determined using the normalized cross-PSD function) input to the sigmoid function.

The device 110 may suppress (828) residual echo using the gain values. For example, the device 110 may pass (e.g., gain value of 1) or suppress (e.g., gain value less than 1) audio data input to the RES 234 for an individual frequency band. The gain value corresponds to an amount of suppression, with a value of zero corresponding to complete suppression (e.g., none of the input audio data passed by the RES 234) and a value between zero and one suppressing a portion of the input audio data and passing a portion of the input audio data.

Figure 9:
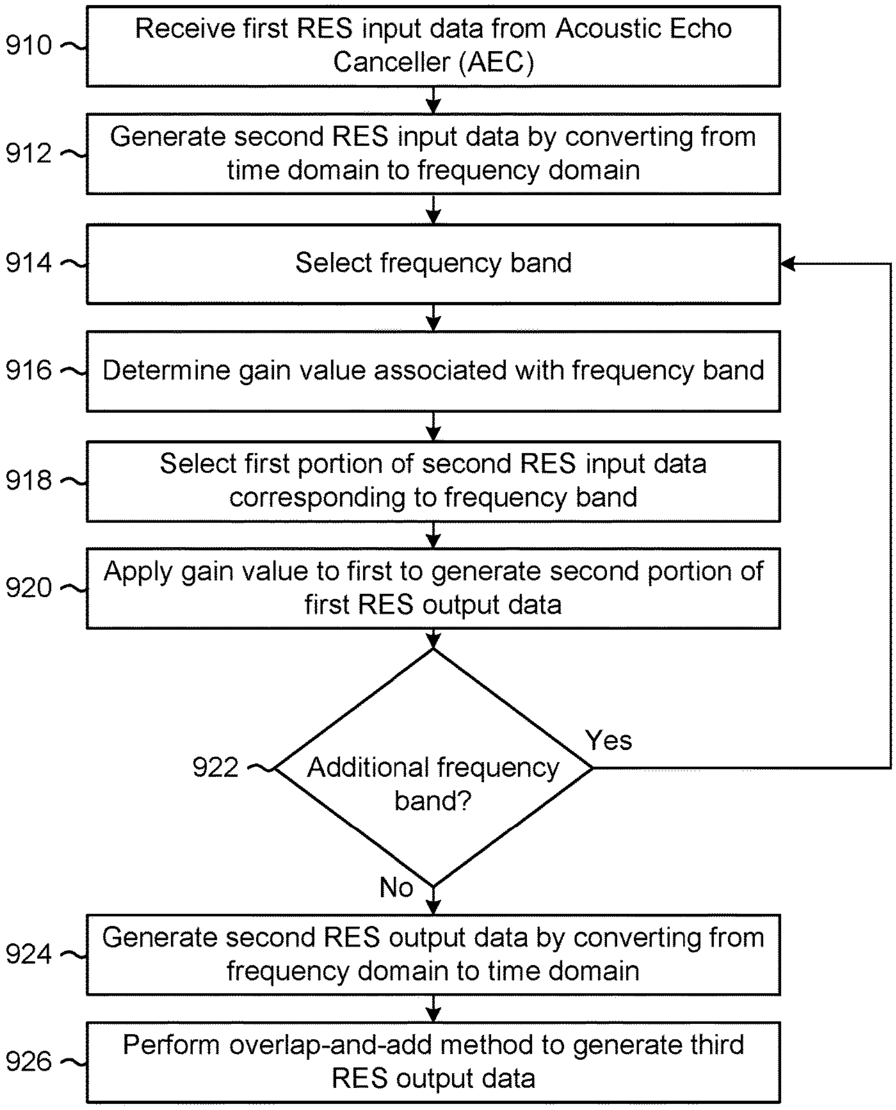
FIG. 9 is a flowchart conceptually illustrating a method for performing residual echo suppression according to examples of the present disclosure.

FIG. 9 is a flowchart conceptually illustrating a method for performing residual echo suppression according to examples of the present disclosure. As illustrated in FIG. 9, the device 110 may receive (910) first RES input data from an acoustic echo canceller (AEC) and may generate (912) second RES input data by converting from the time domain to the frequency domain. For example, the device 110 may perform windowing and FFT to the RES input data m(t) to generate RES input data M(k).

The device 110 may select (914) a frequency band and may determine (916) a gain value associated with the selected frequency band. The device 110 may select (918) a first portion of the second RES input data M(k) within the selected frequency band and may apply (920) the gain value to the first portion of the second RES input data M(k) to generate a second portion of first RES output data R(k). The device 110 may determine (922) if there is an additional frequency band and, if so, may loop to step 914 to select the additional frequency band and repeat steps 914-922.

If there is not an additional frequency band, the device 110 may generate (924) second RES output data by converting the first RES output data from the frequency domain to the time domain to generate second RES output data and may perform an overlap-and-add method using the second RES output data to generate third RES output data. For example, the device 110 may perform an inverse fast Fourier transform (IFFT) function to the first RES output data R(k) to generate second RES output data r'(t), and then perform the overlap-and-add method using the second RES output data r'(t) to generate the third RES output data r(t).

Figure 10A:
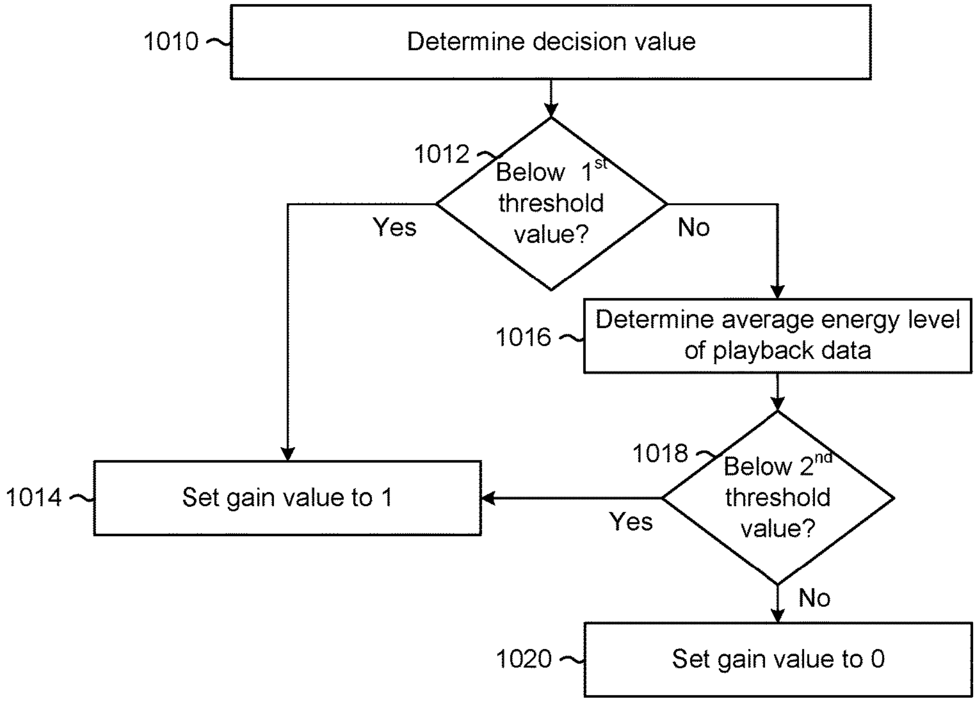
FIGS. 10A-10B are flowcharts conceptually illustrating example methods for determining binary gain values and continuous gain values according to examples of the present disclosure.
Figure 10B:
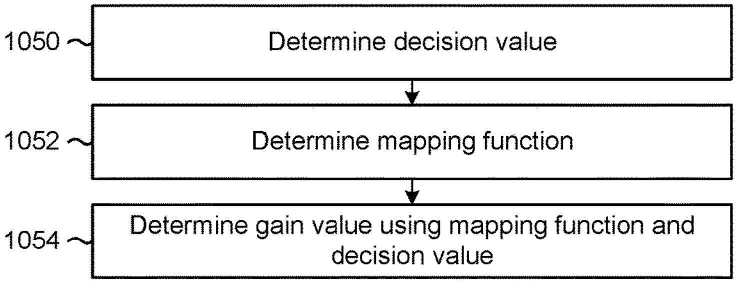

FIGS. 10A-10B are flowcharts conceptually illustrating example methods for determining binary gain values and continuous gain values according to examples of the present disclosure. As illustrated in FIG. 10A, the device 110 may determine (1010) a decision value (e.g., using Equations (1)-(7) discussed in greater detail above) and determine (1012) whether the decision value is below a first threshold value. If the decision value is below the first threshold value, the device 110 may set (1014) a gain value to one. If the decision value is above the first threshold value, the device 110 may determine (1016) an average energy level of playback data and determine (1018) whether the average energy level is below a second threshold value. If the average energy level is below the second threshold value, the device 110 may set (1014) the gain value to one. If the average energy level is above the second threshold value, the device 110 may set (1020) the gain value to zero.

As illustrated in FIG. 10B, the device 110 may determine (1050) a decision value. For example, the device 110 may use Equations (1)-(7) discussed in greater detail above to determine the decision value, which may correspond to the normalized cross-PSD function. The device 110 may determine (1052) a mapping function (e.g., sigmoid function) and may determine (1054) a gain value using the mapping function and the decision value. For example, the device 110 may select from two or more sigmoid functions and/or adjust parameters of the sigmoid function and may input the decision value to the sigmoid function to determine the gain value.

Figure 11:
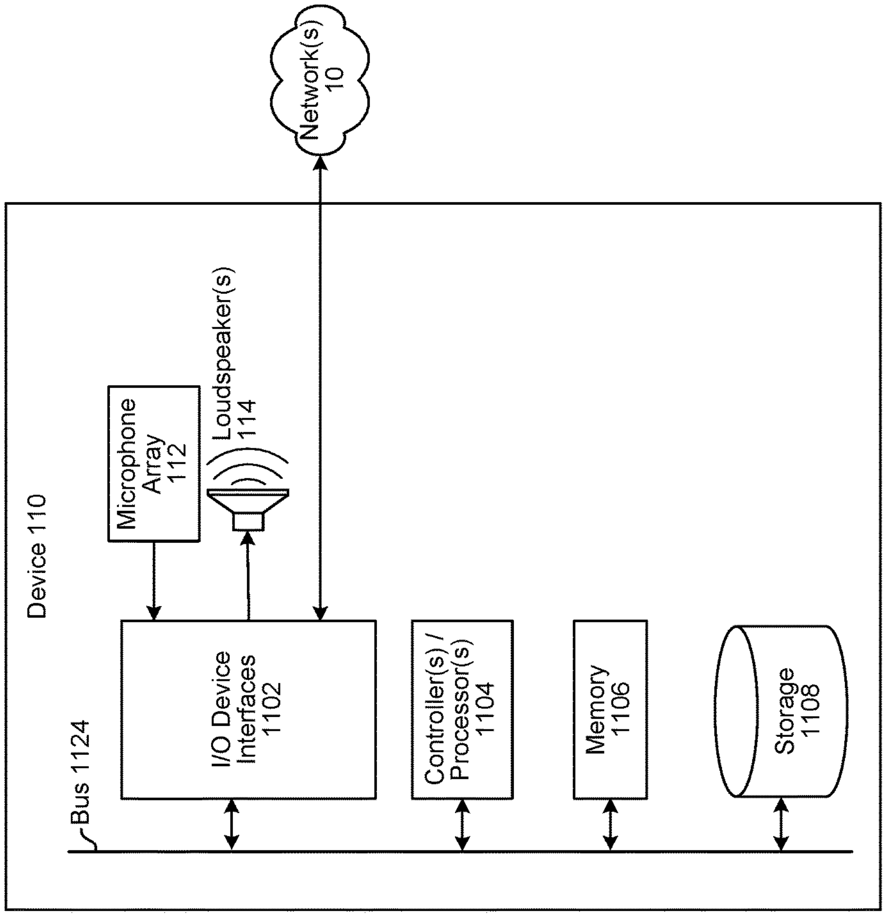
FIG. 11 is a block diagram conceptually illustrating example components of a system according to embodiments of the present disclosure.

FIG. 11 is a block diagram conceptually illustrating example components of a system for voice enhancement according to embodiments of the present disclosure. In operation, the system 100 may include computer-readable and computer-executable instructions that reside on the device 110, as will be discussed further below.

As illustrated in FIG. 11, the device 110 may include an address/data bus 1124 for conveying data among components of the device 110. Each component within the device 110 may also be directly connected to other components in addition to (or instead of) being connected to other components across the bus 1124.

The device 110 may include one or more controllers/processors 1104, which may each include a central processing unit (CPU) for processing data and computer-readable instructions, and a memory 1106 for storing data and instructions. The memory 1106 may include volatile random access memory (RAM), non-volatile read only memory (ROM), non-volatile magnetoresistive (MRAM) and/or other types of memory. The device 110 may also include a data storage component 1108, for storing data and controller/processor-executable instructions (e.g., instructions to perform the algorithm illustrated in FIGS. 1, 8, 9, and/or 10). The data storage component 1108 may include one or more non-volatile storage types such as magnetic storage, optical storage, solid-state storage, etc. The device 110 may also be connected to removable or external non-volatile memory and/or storage (such as a removable memory card, memory key drive, networked storage, etc.) through the input/output device interfaces 1102.

The device 110 includes input/output device interfaces 1102. A variety of components may be connected through the input/output device interfaces 1102. For example, the device 110 may include one or more microphone(s) included in a microphone array 112 and/or one or more loudspeaker (s) 114 that connect through the input/output device interfaces 1102, although the disclosure is not limited thereto. Instead, the number of microphone(s) and/or loudspeaker(s)

114 may vary without departing from the disclosure. In some examples, the microphone(s) and/or loudspeaker(s) 114 may be external to the device 110.

The input/output device interfaces 1102 may be configured to operate with network(s) 10, for example a wireless local area network (WLAN) (such as WiFi), Bluetooth, ZigBee and/or wireless networks, such as a Long Term Evolution (LTE) network, WiMAX network, 3G network, etc. The network(s) 10 may include a local or private network or may include a wide network such as the internet. Devices may be connected to the network(s) 10 through either wired or wireless connections.

The input/output device interfaces 1102 may also include an interface for an external peripheral device connection such as universal serial bus (USB), FireWire, Thunderbolt, Ethernet port or other connection protocol that may connect to network(s) 10. The input/output device interfaces 1102 may also include a connection to an antenna (not shown) to connect one or more network(s) 10 via an Ethernet port, a wireless local area network (WLAN) (such as WiFi) radio, Bluetooth, and/or wireless network radio, such as a radio capable of communication with a wireless communication network such as a Long Term Evolution (LTE) network, WiMAX network, 3G network, etc.

The device 110 may include components that may comprise processor-executable instructions stored in storage 1108 to be executed by controller(s)/processor(s) 1104 (e.g., software, firmware, hardware, or some combination thereof). For example, components of the AEC 232 and/or the RES 234 may be part of a software application running in the foreground and/or background on the device 110. Some or all of the controllers/components of the AEC 232 and/or the RES 234 may be executable instructions that may be embedded in hardware or firmware in addition to, or instead of, software. In one embodiment, the device 110 may operate using an Android operating system (such as Android 4.3 Jelly Bean, Android 4.4 KitKat or the like), an Amazon operating system (such as FireOS or the like), or any other suitable operating system.

Executable computer instructions for operating the device 110 and its various components may be executed by the controller(s)/processor(s) 1104, using the memory 1106 as temporary "working" storage at runtime. The executable instructions may be stored in a non-transitory manner in non-volatile memory 1106, storage 1108, or an external device. Alternatively, some or all of the executable instructions may be embedded in hardware or firmware in addition to or instead of software.

The components of the device 110, as illustrated in FIG. 11, are exemplary, and may be located a stand-alone device or may be included, in whole or in part, as a component of a larger device or system.

The concepts disclosed herein may be applied within a number of different devices and computer systems, including, for example, general-purpose computing systems, server-client computing systems, mainframe computing systems, telephone computing systems, laptop computers, cellular phones, personal digital assistants (PDAs), tablet computers, video capturing devices, video game consoles, speech processing systems, distributed computing environments, etc. Thus the components, components and/or processes described above may be combined or rearranged without departing from the scope of the present disclosure. The functionality of any component described above may be allocated among multiple components, or combined with a different component. As discussed above, any or all of the components may be embodied in one or more general-purpose microprocessors, or in one or more special-purpose digital signal processors or other dedicated microprocessing hardware. One or more components may also be embodied in software implemented by a processing unit. Further, one or more of the components may be omitted from the processes entirely.

The above embodiments of the present disclosure are meant to be illustrative. They were chosen to explain the principles and application of the disclosure and are not intended to be exhaustive or to limit the disclosure. Many modifications and variations of the disclosed embodiments may be apparent to those of skill in the art. Persons having ordinary skill in the field of computers and/or digital imaging should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Embodiments of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk and/or other media.

Embodiments of the present disclosure may be performed in different forms of software, firmware and/or hardware. Further, the teachings of the disclosure may be performed by an application specific integrated circuit (ASIC), field programmable gate array (FPGA), or other component, for example.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Conjunctive language such as the phrase "at least one of X, Y and Z," unless specifically stated otherwise, is to be understood with the context as used in general to convey that an item, term, etc. may be either X, Y, or Z, or a combination thereof. Thus, such conjunctive language is not generally intended to imply that certain embodiments require at least one of X, at least one of Y and at least one of Z to each is present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method for removing double-talk effects, the method comprising:

receiving, by a device having a microphone and a loudspeaker, first audio data during a communication connection;

outputting, by the loudspeaker, audible sound corresponding to the first audio data;

receiving second audio data from the microphone, the second audio data being in a time domain and including a first representation of the audible sound and a first representation of speech detected by the microphone;

determining third audio data corresponding to an estimate of the audible sound detected by the microphone, the third audio data being in the time domain and including a second representation of the audible sound;

performing acoustic echo cancellation to remove the third audio data from the second audio data to generate fourth audio data in the time domain, the fourth audio data corresponding to output from an acoustic echo canceller;

determining fifth audio data by taking a discrete Fourier transform of the second audio data, the fifth audio data being in the frequency domain and corresponding to the output from the microphone;

determining sixth audio data by taking a discrete Fourier transform of the third audio data, the sixth audio data being in the frequency domain and corresponding to the estimate of the audible sound detected by the microphone;

determining seventh audio data by taking a discrete Fourier transform of the fourth audio data, the seventh audio data being in the frequency domain and corresponding to the output from the acoustic echo canceller;

selecting a first frequency band within a human hearing range;

determining a first correlation value corresponding to the first frequency band, wherein the first correlation value is determined using a normalized cross power spectral density function between the fifth audio data and the sixth audio data, the first correlation value indicating a correlation between the fifth audio data and the sixth audio data;

determining, based on the first correlation value, a first gain value associated with the first frequency band;

determining a second correlation value corresponding to a second frequency band using the normalized cross power spectral density function, the second frequency band within the human hearing range;

determining, based on the second correlation value, a second gain value associated with the second frequency band; and determining eighth audio data using the seventh audio data, the first gain value, and the second gain value, the eighth audio data including a second representation of the speech.

2. The computer-implemented method of claim 1, wherein:

determining the first gain value further comprises:

determining that the first correlation value is below a threshold value that distinguishes between a weak correlation and a strong correlation; and setting the first gain value equal to a value of one, and determining the second gain value further comprises:

determining that the second correlation value is above the threshold value; and setting the second gain value equal to a value of zero.

3. The computer-implemented method of claim 1, wherein:

determining the first gain value further comprises inputting the first correlation value to a sigmoid function, determining the second gain value further comprises inputting the second correlation value to the sigmoid function, and determining the eighth audio data further comprises:

determining a first portion of the seventh audio data, wherein the first portion is within the first frequency band;

determining a second portion of the seventh audio data, wherein the second portion is within the second frequency band;

generating a first portion of the eighth audio data by multiplying the first portion of the seventh audio data by the first gain value, wherein the first portion of the eight audio data is within the first frequency band;

generating a second portion of the eighth audio data by multiplying the second portion of the seventh audio data by the second gain value, wherein the second portion of the eight audio data is within the second frequency band; and generating the eighth audio data by combining the first portion of the eighth audio data and the second portion of the eighth audio data.

4. The computer-implemented method of claim 1, wherein:

determining the first gain value further comprises:

determining a first power value corresponding to the first frequency band using a first power spectral density function associated with the fifth audio data;

determining a second power value corresponding to the first frequency band using a second power spectral density function associated with the seventh audio data;

determining a ratio of the first power value to the second power value, the ratio indicating whether double-talk conditions are present;

selecting, based on the ratio, a first sigmoid function;

determining the first gain value by inputting the first correlation value to the first sigmoid function; and determining the second gain value by inputting the second correlation value to the first sigmoid function.

5. A computer-implemented method comprising:

determining first audio data that is in a frequency domain and includes a first representation of audible sound output by at least one loudspeaker;

determining second audio data associated with output from a microphone, the second audio data being in the frequency domain and including a second representation of the audible sound and a first representation of speech;

receiving third audio data associated with output from an acoustic echo canceller, the third audio data based on the output from the microphone;

determining a first correlation value indicating a correlation between a first portion of the first audio data and a first portion of the second audio data, wherein the first portion of the first audio data and the first portion of the second audio data are within a first frequency band;

determining, based on the first correlation value, a first gain value associated with the first frequency band;

determining a second correlation value indicating a correlation between a second portion of the first audio data and a second portion of the second audio data, wherein the second portion of the first audio data and the second portion of the second audio data are within a second frequency band;

determining, based on the second correlation value, a second gain value associated with the second frequency band; and determining fourth audio data based on the third audio data, the first gain value, and the second gain value, wherein the fourth audio data includes a third representation of the audible sound and a second representation of the speech.

6. The computer-implemented method of claim 5, wherein determining the first correlation value further comprises:

determining, based on a first power spectral density (PSD) function associated with the first audio data, a first power value corresponding to the first frequency band;

determining, based on a second PSD function associated with the second audio data, a second power value corresponding to the first frequency band;

determining, based on a cross-PSD function between the second audio data and a complex conjugate of the first audio data, a third correlation value corresponding to the first frequency band; and determining the first correlation value based on the third correlation value, the first power value, and the second power value.

7. The computer-implemented method of claim 5, wherein:

determining the first gain value further comprises:

determining that the first correlation value is below a threshold value; and setting the first gain value equal to a value of one, determining the second gain value further comprises:

determining that the second correlation value is above the threshold value; and setting the second gain value equal to a value of zero, and determining the fourth audio data further comprises:

determining a first portion of the third audio data, wherein the first portion of the third audio data is within the first frequency band;

determining a second portion of the third audio data, wherein the second portion of the third audio data is within the second frequency band;

determining a first portion of the fourth audio data by multiplying the first portion of the third audio data by the first gain value, wherein the first portion of the fourth audio data is within the first frequency band;

determining a second portion of the fourth audio data by multiplying the second portion of the third audio data by the second gain value, wherein the second portion of the fourth audio data is within the second frequency band; and generating the fourth audio data by combining the first portion of the fourth audio data and the second portion of the audio data.

8. The computer-implemented method of claim 5, wherein:

determining the first gain value further comprises inputting the first correlation value to a sigmoid function, and determining the fourth audio data further comprises:

determining a first portion of the third audio data, wherein the first portion of the third audio data is within the first frequency band; and determining a first portion of the fourth audio data by multiplying the first portion of the third audio data by the first gain value, wherein the first portion of the fourth audio data is within the first frequency band.

9. The computer-implemented method of claim 5, wherein determining the first gain value further comprises:

determining, based on a first power spectral density (PSD) function associated with the first audio data, a first power value corresponding to the first frequency band;

determining, based on a second PSD function associated with the third audio data, a second power value corresponding to the first frequency band;

selecting, based on the first power value and the second power value, a first sigmoid function; and determining the first gain value by inputting the first correlation value to the first sigmoid function.

10. The computer-implemented method of claim 5, wherein determining the first gain value further comprises:

determining, based on a first power spectral density (PSD) function associated with the first audio data, a first power value corresponding to the first frequency band;

determining, based on a second PSD function associated with the third audio data, a second power value corresponding to the first frequency band;

determining a ratio between the first power value and the second power value;

determining parameters of a sigmoid function based on the ratio; and determining the first gain value by inputting the first correlation value to the sigmoid function.

11. The computer-implemented method of claim 5, further comprising:

determining that the first gain value is below a threshold value;

determining that the second frequency band is adjacent to the first frequency band;

determining that the second gain value is above the threshold value; and determining, based on the first gain value and the second gain value, a third gain value associated with the second frequency band.

12. The computer-implemented method of claim 5, further comprising:

determining that the first gain value is below a threshold value, the first gain value associated with the first frequency band during a first time period;

determining a third gain value associated with the first frequency band during a second time period after the first time period; and determining, based on the first gain value and the third gain value, a fourth gain value associated with the first frequency band during the second time period.

13. A device comprising:

at least one processor; and memory including instructions operable to be executed by the at least one processor to perform a set of actions to configure the device to:

determine first audio data that is in a frequency domain and includes a first representation of audible sound output by at least one loudspeaker;

determine second audio data associated with output from a microphone, the second audio data being in the frequency domain and including a second representation of the audible sound and a first representation of speech;

receive third audio data associated with output from an acoustic echo canceller, the third audio data based on the output from the microphone;

determine a first correlation value indicating a correlation between a first portion of the first audio data and a first portion of the second audio data, wherein the first portion of the first audio data and the first portion of the second audio data are within a first frequency band;

determine, based on the first correlation value, a first gain value associated with the first frequency band;

determine a second correlation value indicating a correlation between a second portion of the first audio data and a second portion of the second audio data, wherein the second portion of the first audio data and the second portion of the second audio data are within a second frequency band;

determine, based on the second correlation value, a second gain value associated with the second frequency band; and determine fourth audio data based on the third audio data, the first gain value, and the second gain value, wherein the fourth audio data includes a third representation of the audible sound and a second representation of the speech.

14. The device of claim 13, wherein the device is further configured to:

determine, based on a first power spectral density (PSD) function associated with the first audio data, a first power value corresponding to the first frequency band;

determine, based on a second PSD function associated with the second audio data, a second power value corresponding to the first frequency band;

determine, based on a cross-PSD function between the second audio data and a complex conjugate of the first audio data, a third correlation value corresponding to the first frequency band; and determine the first correlation value based on the third correlation value, the first power value, and the second power value.

15. The device of claim 13, wherein the device is further configured to:

determine that the first correlation value is below a threshold value;

determine the first gain value by setting the first gain value equal to a value of one;

determine that the second correlation value is above the threshold value;

determine the second gain value by setting the second gain value equal to a value of zero;

determine a first portion of the third audio data, wherein the first portion of the third audio data is within the first frequency band;

determine a second portion of the third audio data, wherein the second portion of the third audio data is within the second frequency band;

determine a first portion of the fourth audio data by multiplying the first portion of the third audio data by the first gain value, wherein the first portion of the fourth audio data is within the first frequency band; and determine a second portion of the fourth audio data by multiplying the second portion of the third audio data by the second gain value, wherein the second portion of the fourth audio data is within the second frequency band; and generate the fourth audio data by combining the first portion of the fourth audio data and the second portion of the fourth audio data.

16. The device of claim 13, wherein the device is further configured to:

determine the first gain value by inputting the first correlation value to a sigmoid function;

determine a first portion of the third audio data, wherein the first portion of the third audio data is within the first frequency band; and determine a first portion of the fourth audio data by multiplying the first portion of the third audio data by the first gain value, wherein the first portion of the fourth audio data is within the first frequency band.

17. The device of claim 13, wherein the device is further configured to:

determine, based on a first power spectral density (PSD) function associated with the first audio data, a first power value corresponding to the first frequency band;

determine, based on a second PSD function associated with the third audio data, a second power value corresponding to the first frequency band;

select, based on the first power value and the second power value, a first sigmoid function; and determine the first gain value by inputting the first correlation value to the first sigmoid function.

18. The device of claim 13, wherein the device is further configured to:

determine, based on a first power spectral density (PSD) function associated with the first audio data, a first power value corresponding to the first frequency band;

determine, based on a second PSD function associated with the third audio data, a second power value corresponding to the first frequency band;

determine a ratio between the first power value and the second power value;

determine parameters of a sigmoid function based on the ratio; and determine the first gain value by inputting the first correlation value to the sigmoid function.

19. The device of claim 13, wherein the device is further configured to:

determine that the first gain value is below a threshold value;

determine that the second frequency band is adjacent to the first frequency band;

determine that the second gain value is above the threshold value; and determine, based on the first gain value and the second gain value, a third gain value associated with the second frequency band.

20. The device of claim 13, wherein the device is further configured to:

determine that the first gain value is below a threshold value, the first gain value associated with the first frequency band during a first time period;

determine a third gain value associated with the first frequency band during a second time period after the first time period; and determine, based on the first gain value and the third gain value, a fourth gain value associated with the first frequency band during the second time period.

* * * * *